United States Patent

[11] 3,585,500

[72] Inventor Stanley J. Grubel
 Wappingers Falls, N.Y.
[21] Appl. No. 848,802
[22] Filed Aug. 11, 1969
[45] Patented June 15, 1971
[73] Assignee International Business Machines
 Corporation
 Armonk, N.Y.

[54] DYNAMIC TIME/VOLTAGE TEST SYSTEM
 15 Claims, 20 Drawing Figs.
[52] U.S. Cl.................................................. 324/102,
 324/68, 324/73, 324/158
[51] Int. Cl...................................................G01r 19/00,
 G01r 15/12, G01r 31/22
[50] Field of Search........................................ 324/158,
 102, 73, 68 C; 328/151, 186; 307/257

[56] References Cited
 UNITED STATES PATENTS
 3,359,491 12/1967 McCutcheon................ 324/158 X
 3,423,677 1/1969 Alford et al.................... 324/158 X Primary Examiner—Rudolph V. Rolinec
Assistant Examiner—Ernest F. Karlsen
Attorney—Hanifin and Jancin ABSTRACT: The test system characterizes a unit under test (UUT) by measuring on repetitive waveforms either the voltage level of the output waveshape at a specific time or the time required for the output waveshape to reach a specific voltage level. The system includes three main assemblies, a measuring assembly, D/A converter and controller. The measuring assembly employs a strobed tunnel diode as a voltage sampler for making all voltage and time measurements. The D/A converter functions as an interface device between the system and an external control means or computer. The controller extends the capabilities of the measuring assembly and includes: a countdown circuit to allow the system to handle high repetition rate signals; a delay circuit to assure proper time position of the measuring assembly with respect to the waveform being measured; a time calibrate subassembly which operates in conjunction with an A/D/A subassembly to allow for automatic calibration of the system; a peak detector subassembly which permits the system to make peak and valley measurements and allows preconditioning of the voltage sampler in the measuring assembly to make speedier measurements; and, a DC multiplex circuit card to allow for differential measurements and filtering the measurement to increase its precision. In addition, the system can be used as a sampling head for a real time oscilloscope.

PATENTED JUN 15 1971

INVENTOR
STANLEY J. GRUBEL

BY Joseph L. Spiegel

ATTORNEY

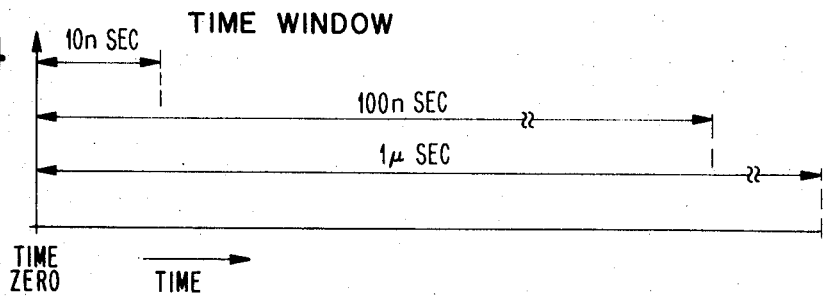
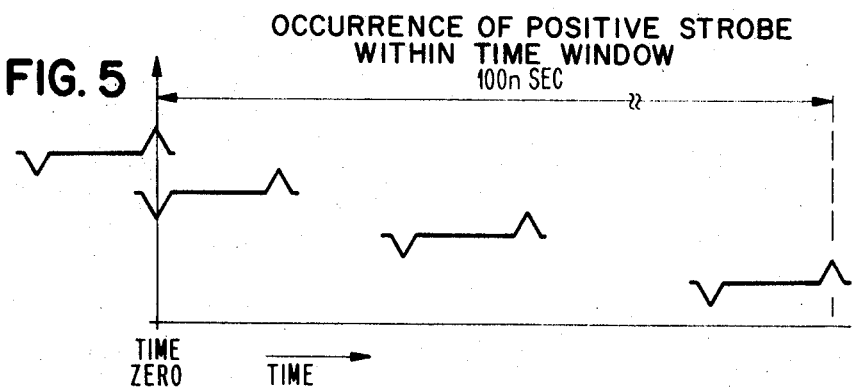
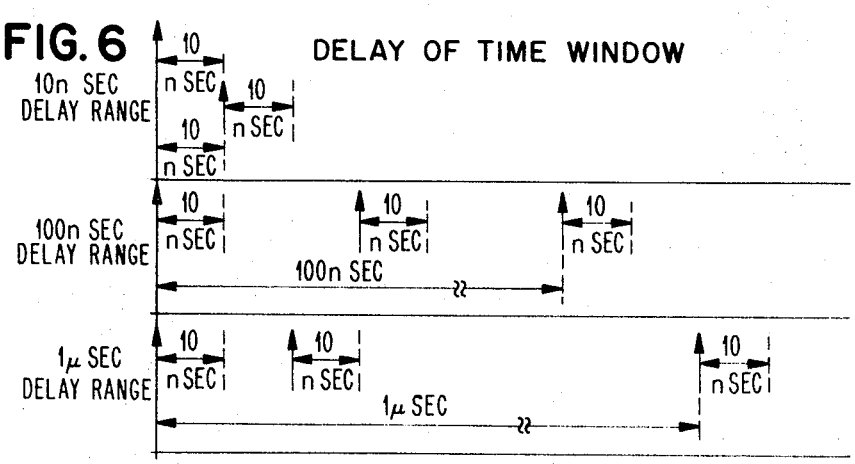
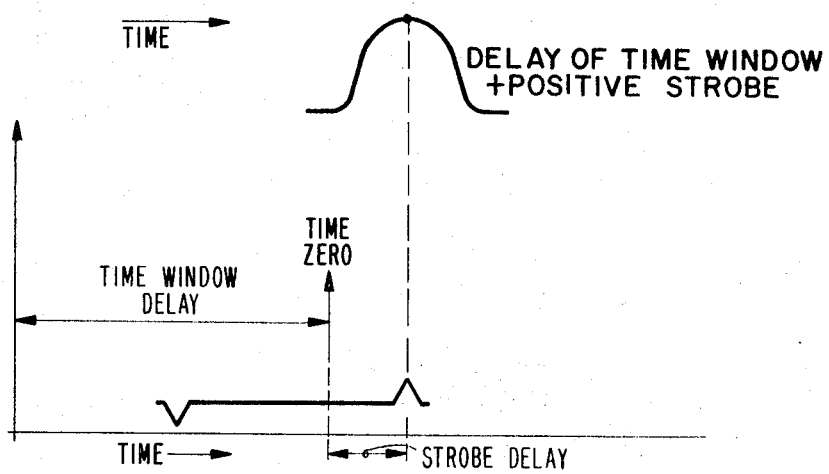

FIG. 9     MEASURING ASSEMBLY  35

DYNAMIC TIME/VOLTAGE TEST SYSTEM

BACKGROUND OF THE INVENTION

1. Field of the Invention

This invention relates to a test system for determining transient or dynamic characteristics of electrical devices, the devices being characterized by measuring various parameters of their output waveshape. The system is operable under control of an external control means or computer.

2. Description of the Prior Art

In a copending application of John F. Merrill, Ser. No. 663,710 filed Aug. 28, 1967, and assigned to the same assignee as the present invention (IBM Docket FI 9-67-043) a measuring assembly for characterizing electrical devices by measuring various parameters of their output waveshape is described. The assembly operates in conjunction with a clock for simultaneously applying pulses to a unit under test and to delay means. Typically, one is interested in the response of this UUT to the application of the stimuli pulse. The assembly includes a tunnel diode discriminator having three inputs: the output signal from the UUT; the pulse signal from a reset and strobe unit connected between the delay means and tunnel diode discriminator; and, a bias input. The bias level and occurrence of the strobe are variable in such manner that the tunnel diode will fire only at strobe occurrence when the sum of the bias current, strobe current and signal current are above the peak current of the tunnel diode.

The assembly makes two types of measurements, voltage and time. When operating in a voltage mode one is interested in determining the instantaneous voltage that is achieved by the UUT response signal at a particular time. When operating in a time mode one wishes to measure the time at which the UUT response signal achieves a particular predetermined voltage.

In the voltage mode, the UUT response signal in conjunction with the superimposed strobe pulse is applied to the tunnel diode along with the DC bias signal. The magnitude of the DC bias signal is controlled through a feedback loop from the tunnel diode until at strobe occurrence, the sum of the currents equals the threshold level of the tunnel diode, at which time the bias level becomes a measurement of the input signal.

In the time mode the UUT response signal in conjunction with a fixed DC bias signal is applied to the tunnel diode along with the strobe pulse. The position of the strobe pulse is now controlled through the feedback loop from the tunnel diode until the strobe is in coincidence with the UUT response signal whereupon the sum of the currents equals the threshold level of the tunnel diode. The level of the feedback loop becomes a measurement of the time at which the UUT response signal achieves the predetermined voltage.

SUMMARY OF THE INVENTION

A general object of the present invention is a test system which characterizes electrical devices by measuring various parameters of their output waveshape, with improved data acquisition time and precision and which can be automatically controlled by a computer.

Another object is such a system which characterizes electrical devices by measuring either the voltage level of its output waveshape at a particular time or the time required for its output waveshape to reach a specific voltage level.

Still another object is accurate time position of the system with respect to the output waveshape being measured.

A further object is such a system which can be preconditioned to perform time and voltage measurements rapidly.

Another object is a system which can make measurements on high repetition rate waveshapes.

Still another object is the provision of automatic calibration in such a test system.

A further object is the provision in such a system of a peak detection capability.

A still further object is the provision in such a system of a differential measurement capability.

Another object is the provision in such a system of means for making two simultaneous measurements on the same output waveshape.

Still another object is such a system that can be used as a sampling head for a real time oscilloscope.

BRIEF DESCRIPTION OF THE DRAWING

The foregoing and other objects, features and advantages of the invention will be apparent from the following more particular description of the present invention as illustrated in the accompanying drawings, wherein:

FIG. 4 is a timing diagram illustrating time windows;

FIG. 5 is a timing diagram illustrating the occurrence of a negative and positive strobe pulse relative to a time window;

FIG. 6 is a timing diagram illustrating the delay of time windows;

FIG. 7 is a timing diagram illustrating the delay of a time window and positive strobe so as to coincide with the UUT response signal;

FIG. 8A is a block diagram showing FIGS. 8 through 10 positioned in appropriate relationship;

GENERAL OVERALL DESCRIPTION

A. Introduction

The system forming the subject matter of this application is an analog measuring system that characterizes the performance of a large number of electrical devices. The devices are characterized by measuring the various parameters of their output waveshapes, or (in the case of dynamic impedance) of the devices themselves. The system can accurately measure the following: (1) Any instantaneous voltage that occurs in any part of the output waveshape; (2) The differential amplitude that exists between any two points on the output waveshape; (3) The peak, valley, or peak to valley voltage achieved by the output waveshape; (4) The dynamic impedance of a unit under test (UUT), or of coaxial transmission lines; (5) The time required for the output waveshape of the UUT to achieve any instantaneous voltage, as long as the instantaneous voltage selected for a time measurement is not part of a DC level ($dV/dT$  0); (6) The transition time between any two instantaneous voltages in the selected transition; (7) The pulse width that exists between any two instantaneous voltages in the output waveshape; and, (8) The delay between two different synchronized signals.

The system can perform any of the previously listed measurements under manual control, or under the remote control of an external control means or computer. Normally the system operates automatically, under the control of an external control means.

In addition to the previously listed measurements, the system, under manual control, can be used as a sampling head to display one or two fast-rise-time signals on a real time oscilloscope.

Figure 1:
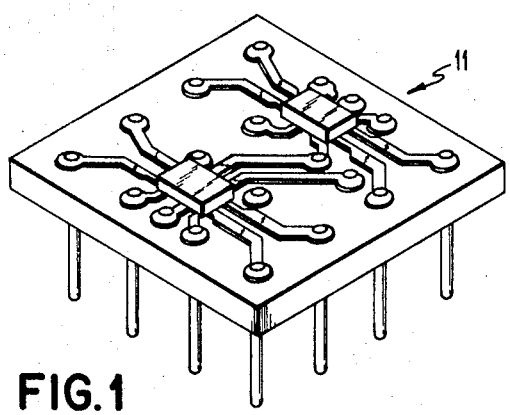
FIG. 1 depicts in perspective, a typical UUT.

Referring now to FIG. 1 of the drawing the unit under test (UUT) 11 is the device characterized by the system. Typical devices are integrated circuit devices and modules, transistors, transmissions lines, any solid state device, any periodic AC waveform, waveform generator systems such as pulse generators, logic and memory circuits, etc.

The system is most commonly used to make measurements on the output waveshape of a UUT but the system can make measurements on any signal that meets the input signal requirements. In this application the term "UUT response signal" is commonly used to indicate the repetitive output waveshape of a UUT, but also includes any other input signal being characterized by the system.

Figure 2:
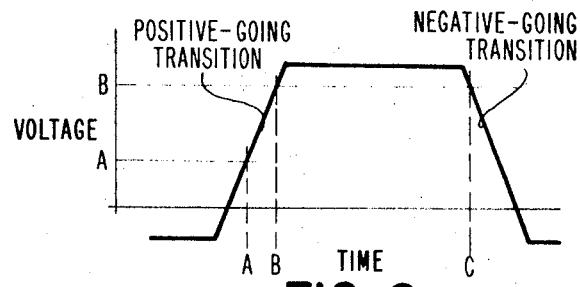
FIG. 2 is a typical output waveshape of a UUT.

FIG. 2 shows the typical output waveshape of a UUT. The term "positive-going transition" refers to the transition of the UUT response signal whose voltage is changing in a positive direction. The instantaneous voltages in a positive-going transition can be either positive or negative. Similarly the term "negative-going transition" refers to the transition of the UUT response signal whose voltage is changing in a negative direction. Likewise the instantaneous voltages in the negative-going transition can also be either positive or negative.

The system makes two basic types of measurements, voltage measurements and time measurements. If the operator of the system (or the programmer of the external control means) wants to measure the instantaneous voltage that is achieved by the UUT response signal at a particular time, he sets the proper controls (or, programs the external control means to pick the proper drive lines) to indicate the time at which this instantaneous voltage occurs. Assume that the instantaneous voltage to be measured occurs in the positive-going transition of the UUT response signal at time A. The system will measure voltage A. If the system is set up to measure the instantaneous voltage in the positive-going transition that occurs at time B, the system will measure voltage B.

Assume that the system operator (or the programmer of the external control means) wishes to measure the time at which the UUT response signal achieves a particular, predetermined voltage. He would then set the controls (or program the external control means to pick proper drive lines) to indicate the magnitude and the polarity of the instantaneous voltage selected for a time measurement, and the transition in which this voltage occurs. Assume that voltage B in the negative-going transition is selected for a time measurement. When the system controls have been properly set (or the proper drive lines picked), the system will measure time C. All time measurements are made with respect to a time reference which is referred to as "time 0."

The system makes a number of other types of measurements in addition to the basic voltage and time measurements. These other types of measurements are simply modifications of the basic voltage or time measurements described above.

Figure 3:
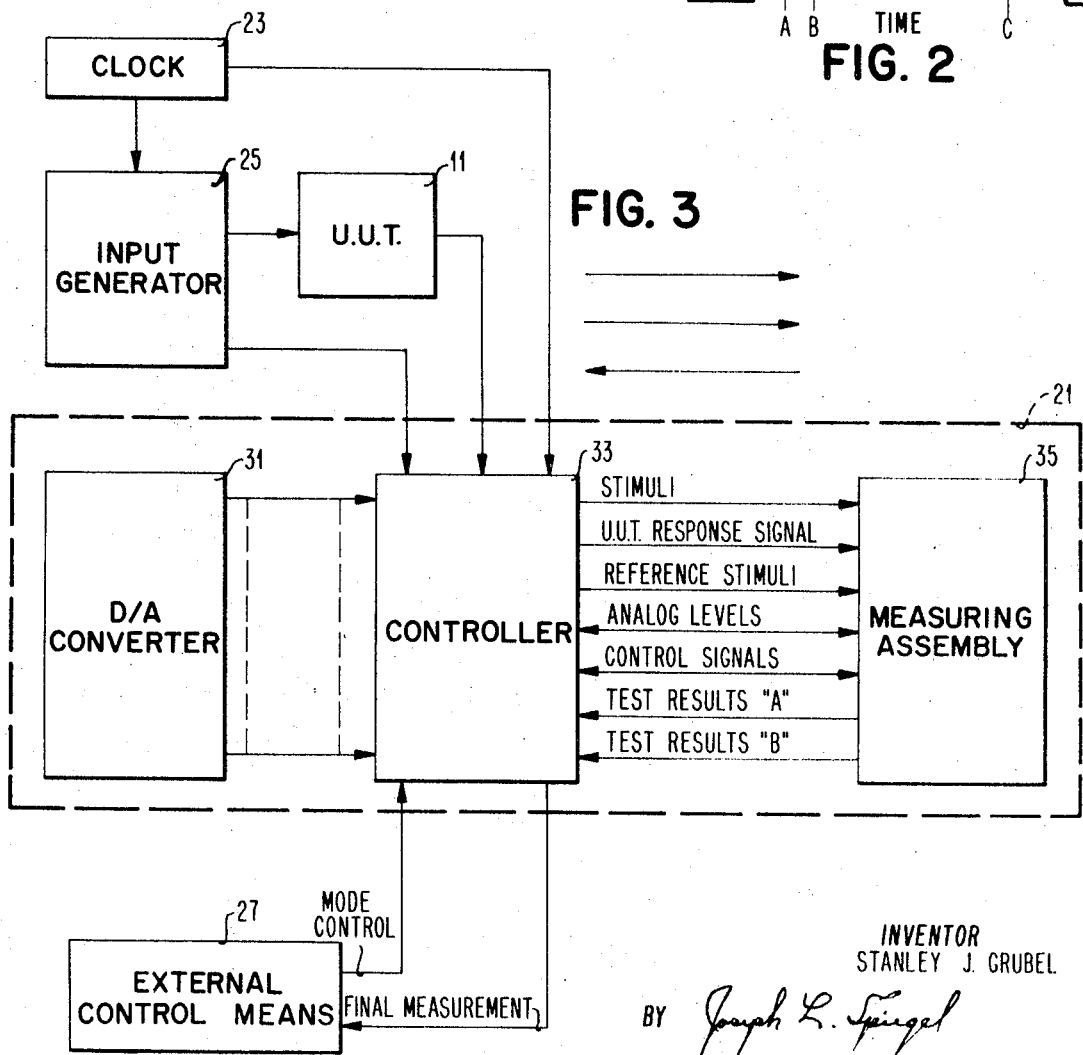
FIG. 3 is a simplified block diagram of the system operated by an external control means.

Reference will now be had to the simplified block diagram of FIG. 3 which shows the system 21 in a typical intended environment. The system is operated in association with a clock 23 which provides a source of accurately timed pulses to the system 21 and to an input generator, an input generator 25 which defines the waveform of the stimuli pulse to the UUT 11 and provides a reference pulse to the system 21, and an external control means 27, typically a digital computer, for supply discrete digital inputs to the system and converting an analog output from the system to digital form.

The block diagram shows the system 21 as including three principal assemblies, a D/A converter 31, a controller 33 and a measuring assembly 35.

The D/A converter 31 functions as an input interface device between the external control 27 and the system or, when no external control is employed allows an operator to make entries manually.

The basic voltage and time measurements made by the system are made by the measuring assembly 35. The controller 33 assists by conditioning the input UUT response signal(s), synchronizing the operation of the measuring assembly 35 with that of the external control system 27, establishing the time reference (time 0) in time, etc.

The measuring assembly 35 can be used without the D/A converter 31 and controller 33 if the input analog signals normally supplied by the converter are simulated, but then the measuring assembly can only make basic voltage and time measurements. However, the controller 33 enables the measuring assembly 35 to make many other measurements possible and together with certain portions of the D/A converter 31 enables the measuring assembly to make measurements at a much faster rate. In addition, the controller permits automatic calibration of the measuring assembly.

The system has two independent channels A and B. These channels can be used separately to make individual unrelated measurements, or they can be made to work together when two measurements are necessary to derive one answer, for example, peak-to-peak voltage of the UUT response signal.

All measurements made by the system are made in one of two modes of operation, the voltage mode or the time mode. These modes of operation are described below.

B. Voltage Mode of Operation

Either channel can operate in the voltage mode. If one channel is operating in the voltage mode, the other channel can operate in the voltage mode or in the time mode.

If only one channel is in the voltage mode of operation, that channel can measure the following: (1) Any instantaneous voltage that occurs in any part of the UUT response signal; and, (2) The peak or valley voltage of the UUT response signal.

These measurements can be made under manual control or under the remote control of the external control means 27. In addition, one channel, operating alone and under manual control, can also be used as a sampling head to display a fast-rise-time signal on a real time oscilloscope.

With both channels operating simultaneously in the voltage mode, the system can measure the following: (1) Any two instantaneous voltages that occur in two separate UUT response signals; (2) Any two instantaneous voltages that occur in one UUT response signal; (3) The differential amplitude that exists between any two instantaneous voltages in one of two UUT response signals; and, (4) The peak or valley voltages of any two UUT response signals.

In addition, when operating simultaneously and under manual control the channels can be used as sampling heads to display two fast-rise-time signals on a real time, dual-trace oscilloscope.

1. Basic Voltage Measurements

A basic (*unmodified*) voltage measurement is made to measure the instantaneous voltage that exists at a time selected by the operator (or programmer).

All voltage (and time) measurements are made in a time window. Referring to FIG. 4 a time window consists of a reference point in time called time 0 plus a time range. The time ranges have been arbitrarily selected for 10 nanoseconds, 100 nanoseconds, or 1 microsecond and always start at some time 0.

Negative and positive strobe pulses are generated successively in a channel by a strobe delay and strobe generator subassembly in the measuring assembly 35. The negative strobe resets a tunnel diode discriminator in the measuring assembly just prior to the occurrence of the positive strobe pulse. The positive strobe can only occur within the selected time window. During operation in the voltage mode, the selected channel samples the voltage that exists in the UUT response signal at the time that the positive strobe occurs.

If the 10 nanosecond time window is selected for one of the channels, then the positive strobe can be made to occur anywhere from 0 nanoseconds to 10 nanoseconds after time 0 occurs. Referring, for example, to FIG. 5, if the 100-nanosecond time window is selected, the positive strobe can be made to occur anywhere between 0 nanoseconds and 100 nanoseconds after time 0 occurs.

The positive strobe can be made to occur only within one of the three available time windows, and the channel selected measures the instantaneous voltage that exists in the UUT response signal only at the time that the positive strobe occurs. Therefore, to measure the instantaneous voltage that exists at a particular time, the positive strobe must be made to occur at that particular time. If the voltage to be measured occurs outside of the selected time window, then the time window must be moved in time so that the voltage to be measured occurs within it.

Time windows are delayed by the operator or programmer when the input UUT response signal does not occur at the same time as the selected time window.

The time window of a channel can be delayed by delaying the occurrence of time 0. A window delay circuit in the controller delays the occurrence of time 0 in both channels. Time 0 can be delayed up to 10 nanoseconds, up to 100 nanoseconds or up to 1 microsecond.

If the 10-nanosecond delay range is selected, the time windows in both channels can be delayed up to 10 nanoseconds, regardless of which time windows have been selected. By way of example, FIG. 6 shows the 10-nanosecond time window of one channel being delayed in the 10-nanosecond delay range, in the 100-nanosecond delay range and in the 1-microsecond delay range.

Once the time window has been made to occur at the proper position and time, the positive strobe must be delayed so that it occurs simultaneously with the voltage to be measured. See, for example, FIG. 7.

In summary to make a basic voltage measurement, that is, to measure the instantaneous voltage of the UUT response signal that exists at a particular point in time, the channel in use must be put into the voltage mode, a time window must be selected, the selected time window must be delayed if the instantaneous voltage to be measured does not occur within the time window, and the positive strobe must be delayed within the time window so that the strobe and the instantaneous voltage to be measured occur simultaneously.

C. Time Mode of Operation

In the time mode of operation the channels of the system measure the time required for a UUT response signal to reach a preselected voltage. Either or both channels can operate in the time mode.

One channel operating alone in the time mode can measure the time that the UUT response signal requires to reach an instantaneous voltage selected by the user. The user can select any instantaneous voltage for a time measurement, as long as the selected instantaneous voltage occurs in some part of the UUT response signal where the derivative of voltage divided by the derivative of time is not equal to zero.

Where both channels are operating in the time mode, the system can: (1) Measure the time to reach two separate instantaneous voltages on one UUT response signal; and, (2) Measure the time to reach the same or separate instantaneous voltages on two different UUT response signals.

1. Basic Time Measurements

A basic time measurement is made to measure the time at which a preselected instantaneous voltage in the UUT response signal occurs.

In the time mode, an output from the D/A converter 31 represents the instantaneous voltage that has been selected for a time measurement. This output is directly routed to a voltage sampler in the measuring assembly 35 where it is used as a comparison voltage.

The voltage sampler continues to sample the instantaneous voltage that exists at the time that a positive strobe occurs, but a voltage sampler feedback loop controls the position of the positive strobe. Each time that the positive strobe occurs and the voltage sampler samples the existing instantaneous signal voltage, it compares the sampled voltage with the comparison voltage. The voltage sampler feedback loop causes the next positive strobe to occur earlier or later in the time window, based on the results of the comparison. Successive positive strobes are made to occur closer and closer to the preselected instantaneous voltage. Eventually the positive strobe occurs at the same time as the preselected voltage. When this happens the positive strobe hunts and seeks about this point in the time window and the time measurement is now completed.

DETAILED OVERALL DESCRIPTION

Figure 8:
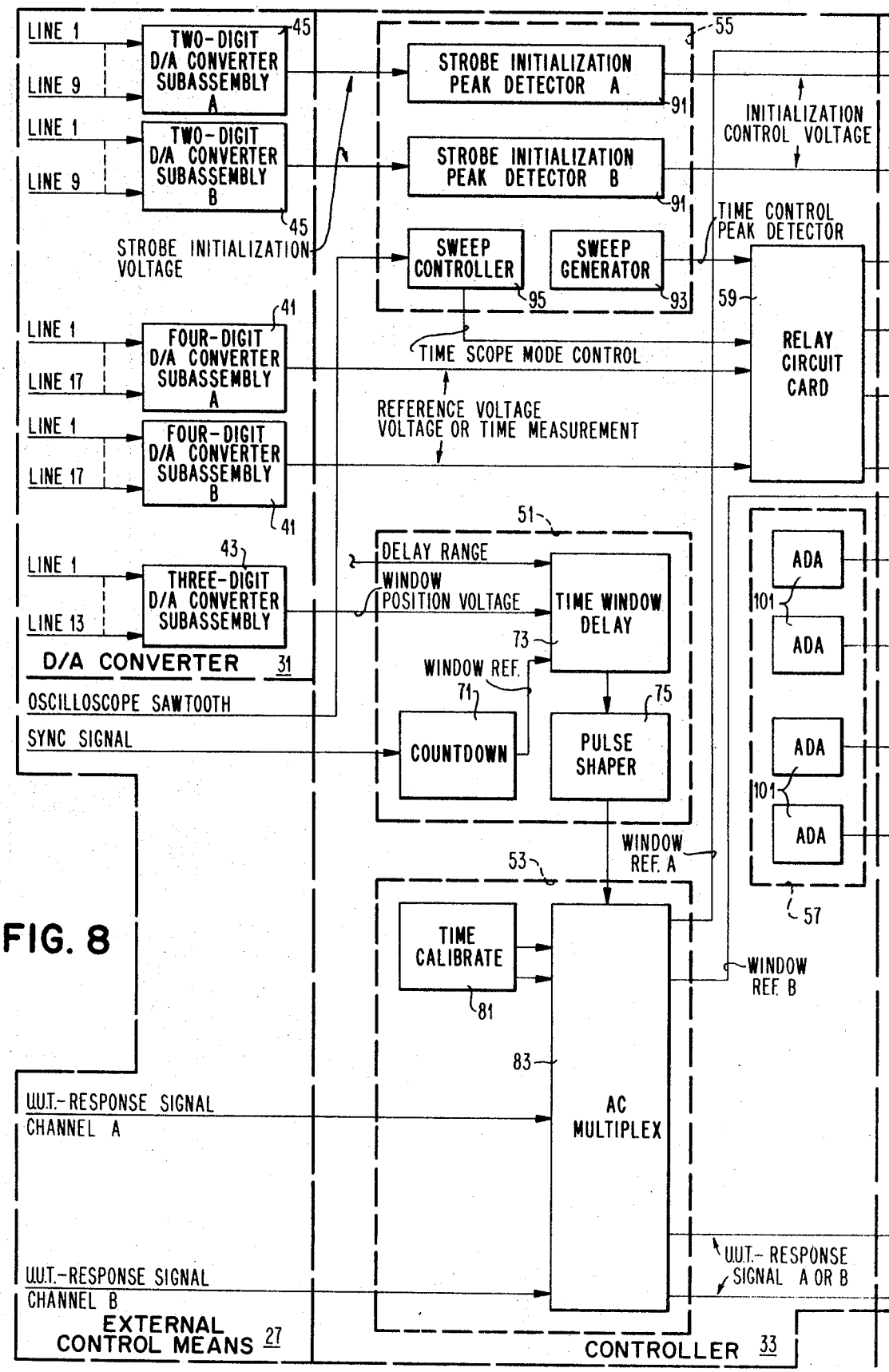
FIGS. 8 through 10 depict the entire system in block diagram form.
Figure 9:
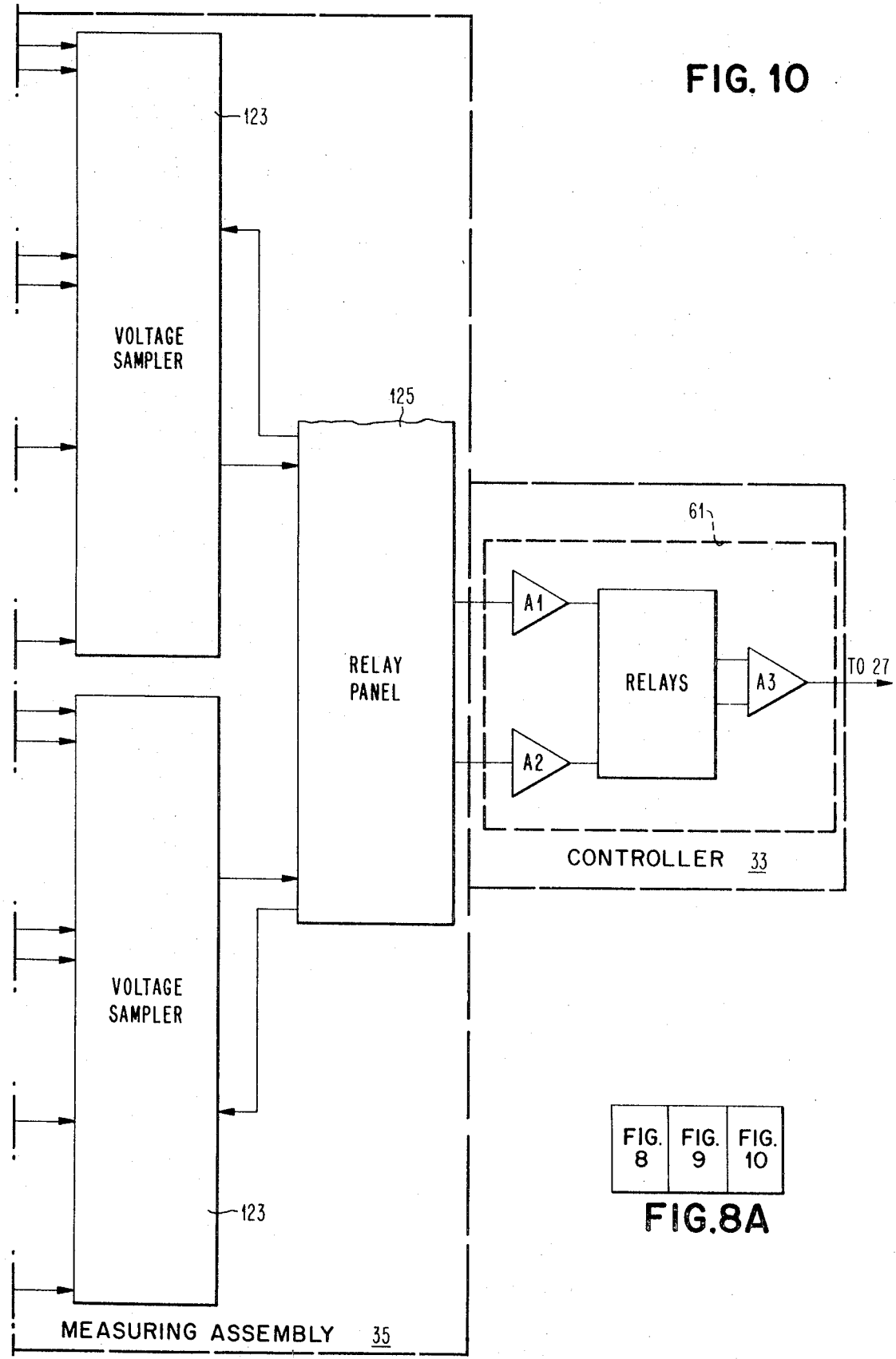
Figure 10:
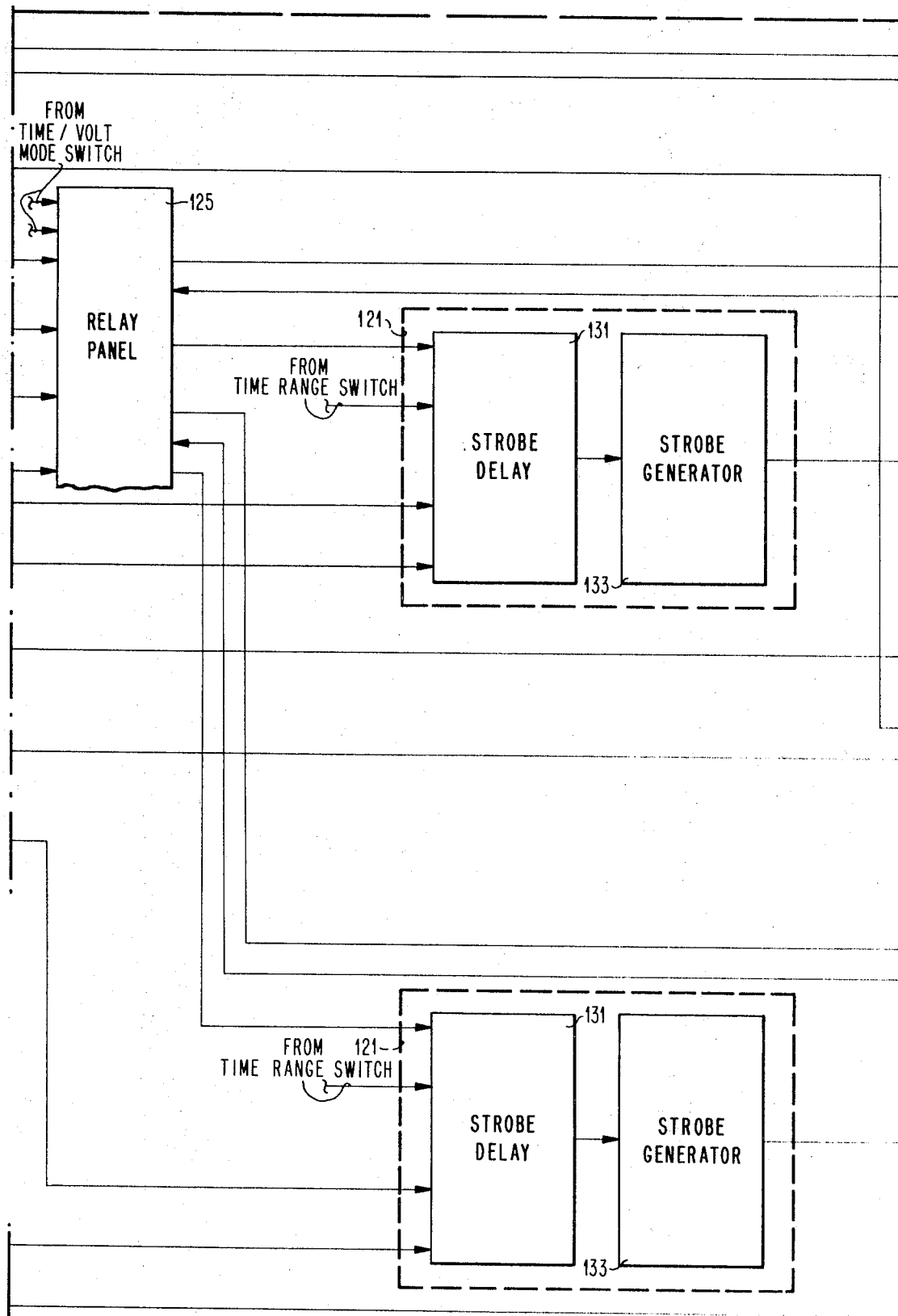

Reference will now be had to FIGS. 8 through 10, which when placed together, again depict the overall system in block form, but in greater detail than FIG. 3 to allow for identification of all the principal subassemblies of the system. Long dashed lines are used to divide the system into its three principal subassemblies, i.e. D/A converter 31, controller 33 and measuring assembly 35. In addition the system's two separate channels are depicted and identified by letters A and B. Some of the assemblies shown are part of channel A, others are part of channel B while still others are shared by both channels.

A. D/A Converter

The overall system required five DC voltages to control various functions. These voltages must be variable. The D/A converter assembly 31 converts binary-coded decimal (BCD) data to analog voltages and enables the system to operate under complete manual control, under the remote control of the external control means 27, or under combined remote/manual control.

When the system is operating under manual control, the D/A converter 31 enables the operator to select the amplitude and polarity of each of the five voltages. The D/A converter 31 routes the five voltages to the controller assembly 33. Relays in the controller then route certain of these voltages to the measuring assembly 35.

When the system is operating under remote control, the D/A converter 31 enables the external control means 27 to automatically select the amplitude and polarity of each of the five voltages.

The BCD inputs represent the amplitude of the DC outputs. The external control means 27 supplied BCD data in a 4/2/2/1 format, and the D/A converter 31 converts this into a DC output that ranges from say +10 volts to −10 volts. The external control means 27 supplies BCD data to the D/A converter 31 by applying ground or open to the appropriate D/A converter drive lines.

The converter contains two four-digit D/A converter subassemblies 41, one three-digit D/A converter 43 subassembly, and two two-digit D/A converter subassemblies 45.

1. Four-Digit D/A Converter Subassemblies

In the voltage mode the system 21 measures the instantaneous voltage that exists on the UUT response signal at a time preselected by the user. The time selected within a time window for a voltage measurement is represented by the output of the four-digit D/A converter 41. This output controls the position of the channel A or channel B strobe in the selected time window, thereby controlling the time at which the channel makes its voltage measurement.

In the time mode, the system 21 measures the time that the UUT response signal takes to reach a predetermined, instantaneous voltage. In the time mode, the output of the four-digit D/A converter 41 represents the instantaneous voltage in the UUT response signal that has been selected for a time measurement.

A relay circuit card in the controller 33 routes the outputs of the four-digit D/A converters to a relay panel in the measuring assembly 35. The relay panel routes these outputs to a strobe delay and strobe generator subassemblies when the system is in the voltage mode or to voltage samplers in the measuring assembly when the system is in the time mode.

2. Three-Digit D/A Converter Subassemblies

As will be explained in more detail below, the controller assembly 33 includes a countdown and time window delay subassembly which generates stimuli that synchronize the operation of the controller assembly 33 and the measuring assembly 35 with the external control means 27. The stimuli pulses synchronize with the sync-signal input, which is supplied by the external control system 27. The sync-signal input occurs in synchronization with the UUT response signal, and eventually causes the stimuli pulses to be generated. The stimuli pulses represent time 0 or the start of a selected time window during which all measurements are made. The time window delay circuit controls where in time "time 0" will be with respect to the UUT response signal. The output of the countdown circuit triggers the time window delay circuit, and a certain, controlled amount of time passes before the time window delay circuit responds. This time is controlled by the output of the three-digit D/A converter 43. When the time window delay circuit does respond, it triggers a pulse shaper circuit, which generates one stimuli pulse each time it is triggered.

3. Two-Digit D/A Converter Subassemblies

In the voltage mode, the output of the two-digit D/A converter 45 is used to slew the output of a voltage sampler subassembly in the measuring assembly 35 to a value that is close to or the same as the expected output of the voltage sampler subassembly after the measurement is made. This is done before the voltage sampler makes the actual voltage measurement, and enables the system to make faster measurements because both channels can respond more quickly.

When the system is set up to measure a peak voltage, the output of the two-digit D/A converter 45 preconditions the output of the voltage sampler to a level just under that of the expected output. But when the system is measuring a valley voltage, the output of the two-digit D/A converter 45 preconditions the output of the voltage sampler to a level just above that of the expected output.

When the system operates in the time mode, the location in time of the start of the time window, as was mentioned above, is controlled by the output of the three-digit D/A converter. The output of the two-digit D/A converter 45 represents approximately where in the established time window the preselected voltage will occur. Having this information, the voltage sampler searches over a smaller time span before locating the preselected instantaneous voltage. When the preselected voltage is located, the voltage sampler output indicates the difference between time 0 and the time that the preselected voltage occurred.

The construction and operation of D/A converters are well within the knowledge of a worker skilled in the art. Accordingly, no further details with respect to the construction and operation of the D/A converter assembly 31 will be given except to the extent necessary to explain the operation of another assembly or subassembly of this system.

B. Controller

The controller 33 extends the capabilities of the measuring assembly 35, making the system 21 capable of performing many more measurements than would otherwise be possible. Specifically, the controller 33 allows the measuring assembly to: (1) make rise time and pulse width measurements of a signal; (2) make time delay measurements between two signals; (3) make voltage level measurements of a signal at a particular time; (4) make peak or valley measurements; (5) make measurements of signals above 500 kHz.; (6) provide automatic calibration of time and voltage offsets; (7) be used as a sampling head for a real time oscilloscope or x–y recorder; and, (8) provide time standards to check the time basis in the measuring assembly. The controller 33 comprises four major subassemblies, a countdown and electronic delay subassembly 51, a time calibrate and AC multiplex subassembly 53, a peak detector subassembly 55 and an analog/digital/analog (ADA) subassembly 57. In addition, the controller contains a relay circuit card 59 and a DC multiplex circuit card 61.

1. Countdown and Time Window Subassembly

The countdown and window delay subassembly 51 synchronizes the controller 33 and the measuring 35 assemblies to input sync signals and UUT response signals with frequencies as high as 100 mHz., and establishes time 0.

1a. Countdown Circuit

Inputs to the countdown circuit 71 can have frequencies up to 100 mHz. or higher. The countdown circuit 71 enables the measuring assembly 35 to make measurements on high repetition rate waveforms greater than 200 kHz. If the frequency of the input sync signal is above 200 kHz., the countdown circuit 71 counts the frequency down to a frequency below 200 kHz., and triggers a time window delay circuit 73 at that new frequency. If the sync signal input is below 200 kHz., the countdown circuit 71 triggers the time window delay circuit 73 at the same frequency as the sync signal. In other words, the countdown circuit 71 will trigger the time window delay circuit 73 at a given frequency at or below 200 kHz. Then the entire system will operate at that frequency and will be synchronized to the sync signal. Since the sync signal is synchronized to the UUT response signal, the system is synchronized to the operational frequency of the UUT.

This circuit is described in more detail in a copending application of Grubel, et al., Ser. No. 829,632 filed June 2, 1969 and assigned to the same assignee as the present invention and that description is incorporated herein by reference.

1b. Time Window Delay Circuit

The time window delay circuit 73 establishes the start of the time window (time 0) at some point in time. The output of the countdown circuit 71 triggers delay circuit 73 insuring that the occurrence of time 0 is synchronized with the input sync signal and the UUT response signals.

The output of the time window delay circuit 73 triggers a pulse shaper circuit 75 which generates a stimuli pulse each time it is triggered. The delay circuit 73 delays its response to the countdown circuit 71 output by a controlled amount of time before triggering the pulse shaper circuit 75.

The time window delay circuit 73 can delay triggering the pulse shaper circuit 75 to any point in time within a predetermined time delay range. These ranges can be selected manually or remotely.

The delay within the selected delay range is controlled by the output voltage of the three-digit D/A converter 43.

Figure 11:
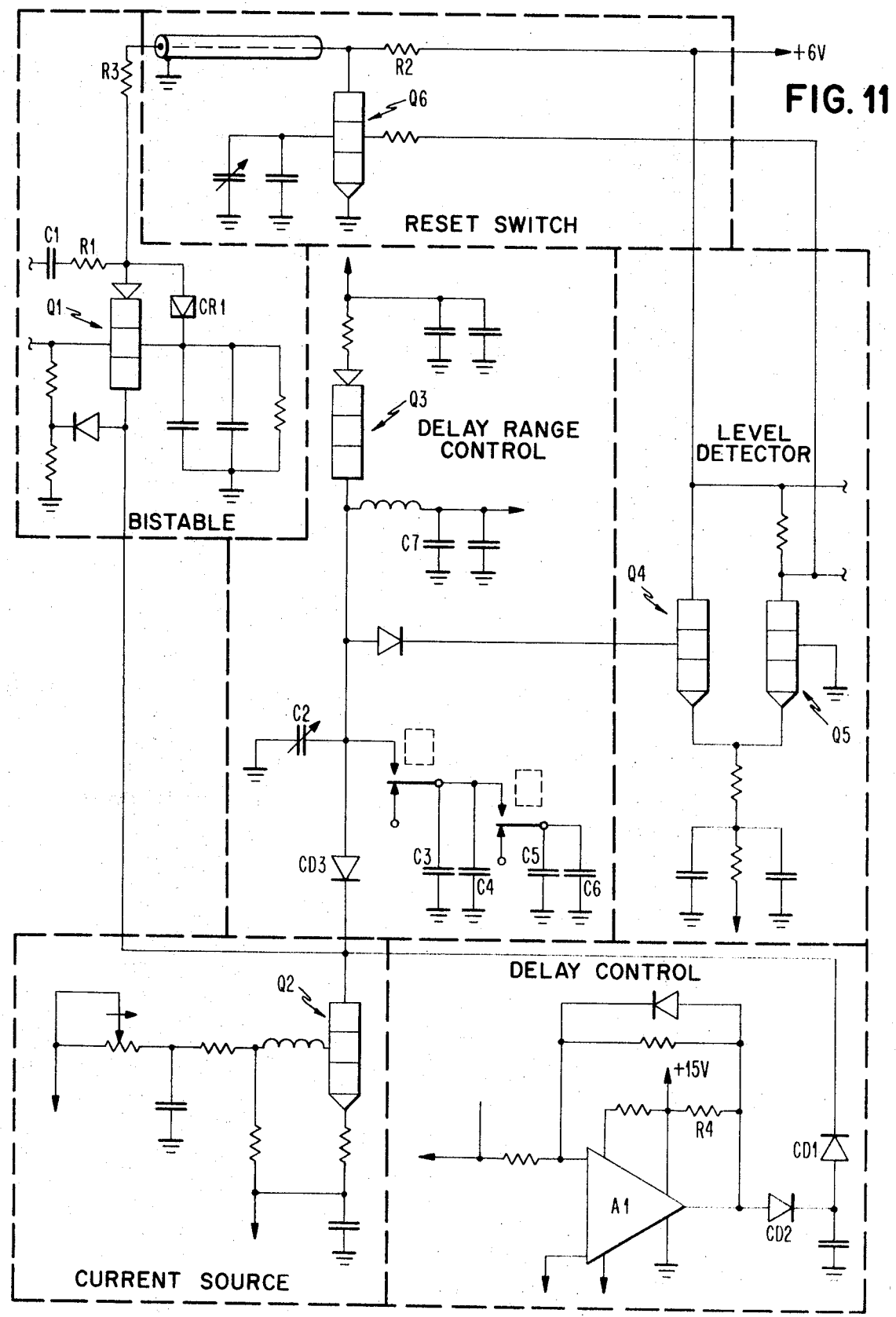
FIG. 11 is a circuit diagram of the time window delay circuit.

For a better understanding of the time window delay circuit reference is had to FIG. 11. The time window delay circuit is shown as including a bistable which can be triggered by an input signal from the output of the countdown circuit to initiate operation of the time window delay circuit; a delay control means which is responsive to the output voltage of the three-digit D/A converter 43; a delay range control means; a current source; level detector; and, reset switch.

A positive pulse from the countdown circuit 71 is coupled to the time window delay circuit 73 through pulse shaping network C1 and R1. Bias current from a +6 v. DC power supply through R2 and R3 flows into tunnel diode CR1. Upon application of a positive pulse to capacitor C1 diode CR1 turns on and forward biases the base-emitter junction of Q1 turning Q1 on. The current drawn by Q1 is split going into Q2 and charging the stray capacitance at the collectors of Q1 and Q2.

As the collector of Q2 begins to rise hot carrier diodes D1 and D2 turn off and the current previously flowing into them from R4 and a +15 v. DC power supply now flows into an operational amplifier A1. Since the cathode of hot carrier diode D3 rises faster than its anode, CD3 is biased off. This helps to isolate the collector of Q3 from the rest of the circuit and aids in producing a very linear ramp. The current which previously flowed through D3 now charges up one or more of the delay range capacitors C2, C3, C4, C5, C6, depending on which range has been selected. The charging of the capacitors at some point will cause the base of Q4 of the level detector to go above ground. Q4 turns on and Q5 turns off. When Q5 turns off its collector rises towards +6 v. DC forward biasing the base-emitter junction of Q6 in the reset switch turning it on. When Q6 turns on its collector decreases causing the bias current flowing through R3 to decrease and diode CR1 current to fall below its minimum current point. When the bias current drops below the minimum current point CR1 turns off turning Q1 off. The collector voltage of Q2 now begins to decrease and CD3 turns on. With CD3 on the collector voltage of Q2 decreases and capacitor C7 discharges. The base of Q4 falls below ground, turning off Q4 and turning on Q5. Then Q6 turns off.

The circuit has an output, whose time of occurrence with respect to the input, is a linear function of program controlled voltage furnished from the D/A converter 43. The delay through the circuit is achieved by controlling the voltage level at which the ramp starts by selecting the different range capacitors.

1c. Pulse Shaper Circuit

Each time that the window delay circuit 73 triggers it the pulse shaper circuit 75 generates one stimuli pulse. The stimuli pulse properly placed in time by the controlled delay of the window delay circuit 73 represents time 0. All voltage and time measurements are made with respect to time 0 in the selected time window.

1d. Power Supply Circuits

The countdown and electronic delay subassembly 51 contains a DC power supply circuit (not shown) and a tunnel diode bias supply circuit (not shown) for providing the operating and bias voltages required by the assembly 51.

2. Time Calibrate and AC Multiplex Subassembly

The time calibrate and AC multiplex subassembly 53 contains a time calibrate circuit 81 and an AC multiplex circuit 83. The time calibrate circuit 81 enables automatic calibration of time offsets in both channels, and checking the accuracy of measurements made in three time windows of both channels. The AC multiplex circuit routes the stimuli output of the countdown and time window delay assembly to both channels and controls the distribution of the UUT response signal (or signals) to the inputs of either or both channels.

2a. Time Calibrate Circuit

The time calibrate circuit enables the controller 33 to provide stimuli pulses and calibration signals whose relative time occurrences are fixed. The stimuli pulses are applied to strobe delay and strobe generator subassemblies in the measuring assembly 35. The calibration signals are applied to the voltage sampler subassembly in either channel. The time calibrate circuit allows checking of the 0-nanosecond position for the channels in the measuring assembly so that differential time measurements (channel B minus channel A) can be made. The variations of drifts in the occurrence 0 nanoseconds can be corrected manually in the measuring assembly and automatically by the ADA circuit in the controller.

The time calibrate circuit also allows checking of the time bases of the 10- and 100-nanosecond time windows. Variations in the time bases can be corrected manually in the strobe delay and strobe generator subassemblies in the measuring assembly.

Figure 12:
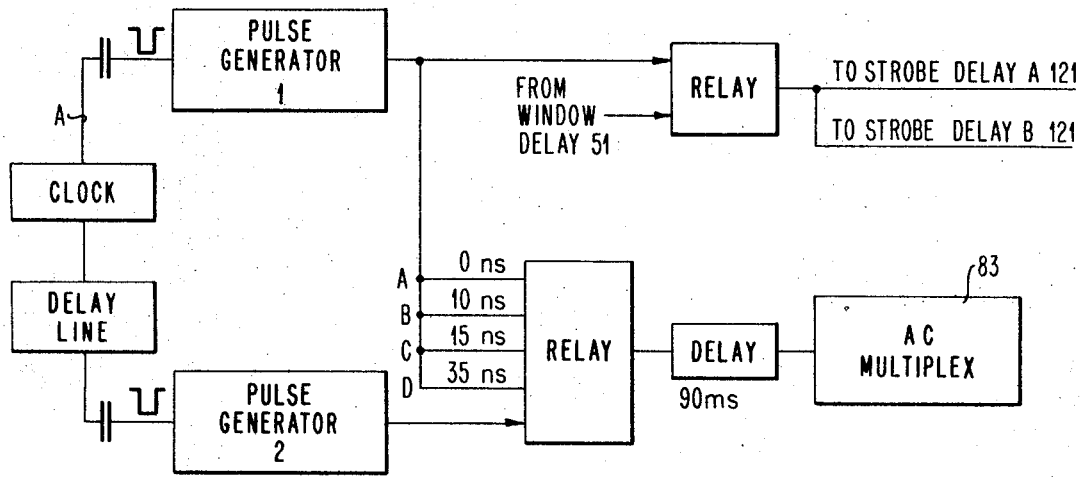
FIG. 12 is a block diagram of the time calibrate circuit.

As shown in more detail in FIG. 12, the time calibrate circuit comprises a clock, two pulse generators, delay lines of various lengths and relays.

The clock provides stable repetitive pulses at 100 kHz. for the time calibrate circuit. The clock is AC coupled to the first pulse generator through a capacitor and to the second pulse generator through a delay line and capacitor.

The output of the first pulse generator is split up. One signal goes to a relay. This is one input to the relay. The other input to the relay is from the window delay 51. Depending upon whether we are in a time calibration mode or normal mode this relay will be picked. In the normal mode of operation the relay is not picked and the output signal is the output of the window delay 51. In the calibration mode the output signal comes from the first pulse generator. This signal is then split up and sent to strobe delay assemblies in both channels. The other output of the first pulse generator is sent down four delay lines, A, B, C, D. This is then sent into a relay tree with one output. This output is delayed 90 milliseconds and then sent into the AC multiplex 83. The 90-milliseconds delay is for inherent delays in the measuring assembly (through the electronic delay and voltage sampler). The signal going through the delay is fed into the AC multiplex 83 and then routed either to voltage sampler A or voltage sampler B. When the signal coming down the line A is sent through the relay and through the 90-millisecond delay, this occurs at voltage sampler A at the beginning of the time window. The signal coming down B is used to check the 10-nanosecond range in the time window. The signal coming down C is used to check the beginning of the 100-nanosecond range and the signal coming down D is used to check another point on the 100-nanosecond range. By being able to check two points on the different ranges, one can obtain a check on the time base. In addition, by routing the output of line A or line C to channel A or channel B the two channels can be lined up so that they both have the time 0. The lining of the time 0 for channel A and channel B is done automatically by use of the analog to digital to analog converter. The ADA senses the offset in a channel, stores this in digital form and writes it back to the channel. The voltage written back is a correction voltage so now the output of the channel will read 0 nanoseconds when delay A is programmed. This is also done to line up the 0-nanosecond point on the 100-nanosecond range for both channels. In this case, line C is used. The output of the second pulse generator is used to line up the 0 point of the 1,000-nanosecond range.

2b. AC Multiplex Circuit

The AC multiplex circuit 83 is a relay arrange which is used to control the distribution of the stimuli signal from pulse shaper 75, the UUT response signals and the calibrate and stimuli signal from time calibrate circuit 81. The output signal from pulse shaper 75 enters the AC multiplex 83, is split and then routed via relay panel 125 to the strobe delay and generator subassembly 121. Normally the UUT response signals are routed to the voltage sampler subassemblies in the measuring assembly. However, when two simultaneous measurements on the same signal are required, the signal is first routed to a power divider (not shown) within the AC multiplex 83. The power divider splits the signal and routes half to each voltage sampler subassembly.

In the time calibrate operation, the stimuli and calibrate signal is routed to the AC multiplex 83 and from there to the delay and strobe assemblies, and the voltage sampler subassemblies in the measuring assemblies respectively.

3. Peak Detector Subassembly

The peak detector subassembly 55 contains two strobe initialization/peak detector circuits 91, one for each channel, a sweep generator circuit 93 and a sweep controller circuit 95. Generally, the peak detector subassembly enables the system to make speedier voltage and time measurements, peak and valley measurements and enables the use of the system as a sampling head for displaying signals with fast-rise times on a real time oscilloscope.

3a. Strobe Initialization/Peak Detector Circuits

In the voltage mode each strobe initialization/peak detector circuit reverses the polarity of the output of the two-digit D/A converter 45, and applies this preconditioning voltage output to a feedback loop in the voltage sampler of the measuring assembly and applies a correction signal to the feedback loop. The output of the two-digit D/A converter 45 causes the output of the voltage sampler to reach a predetermined level before the actual voltage measurement is made. This level is close to, or the same as the level that the voltage sampler output will achieve after the actual measurement is made. This function (preconditioning the voltage sampler output) enables faster system responses when the system operates in connection with the high-speed external control system 27.

When a peak or valley voltage measurement is being made, the two-digit D/A converter 45 together with the strobe initialization/peak detector circuit 91 prevents the voltage sampler output from overshooting. If the channel will measure a positive peak voltage, the output of the voltage sampler is preconditioned to a voltage that is just under the voltage sampler output. If the channel will measure a negative peak (valley) voltage, the voltage sampler output is preconditioned to a voltage that is just above the expected voltage sampler output.

Once the actual peak measurement is made the strobe initialization/peak detector circuit 91 causes the voltage sampler output to maintain, depending on which is being measured, the highest level that it achieved or the lowest level that it achieved.

In the time mode, the strobe initialization/peak detector circuit 91 performs the strobe initialization function allowing the selected channel to measure the time required for the UUT response signal to reach a predetermined instantaneous voltage. This voltage is made to occur within a selected time window. A strobe delay and strobe generator subassembly in the measuring assembly 35 generates negative and positive strobes, and controls the location of each positive strobe within the selected time window. The placement of the positive strobe within the selected time window allows the voltage sampler to sample the instantaneous voltage that exists at the time that the positive strobe occurs.

The two-digit D/A converter 45 and the strobe initialization/peak detector circuit 91 function together to place the positive strobe close in time to the preselected instantaneous voltage, before the actual time measurement is made and guarantees that the strobe moves in the proper direction within the time window so that the feedback will not saturate when searching for equilibrium. The four-digit D/A converter 41 simultaneously routes an output to the voltage sampler that represents the actual predetermined voltage. The voltage sampler samples the instantaneous voltage that exists at the time the positive strobe occurs and compares the sample voltage with the voltage represented by the output of the four-digit D/A converter 41. If the two voltages are not the same, a voltage sampler feedback loop changes the delay of the delay circuit in the strobe delay and strobe generator subassembly in the measuring assembly 35, causing the next positive strobe to be placed closer in time to the preselected voltage. This function continues until the positive strobe is made to occur simultaneously with the preselected voltage. The voltage sampler again samples the existing instantaneous voltage and compares it with the voltage represented by the output of the four-digit D/A converter 41. When the comparison shows that the two voltages are the same, the voltage sampler feedback loop stops repositioning of the positive strobe in the selected time window. At this time, the feedback loop voltage represents the difference between the time that the preselected instantaneous voltage occurred and time 0 in the selected time window. In the time mode the feedback loop voltage serves as the voltage sampler output.

Under certain conditions then, the two-digit D/A converter 45 and the strobe initialization/peak detector circuit 91 enable the time measurements to be made much more quickly by making the voltage sampler search for the preselected voltage in a small portion of the selected time window.

Figure 13:
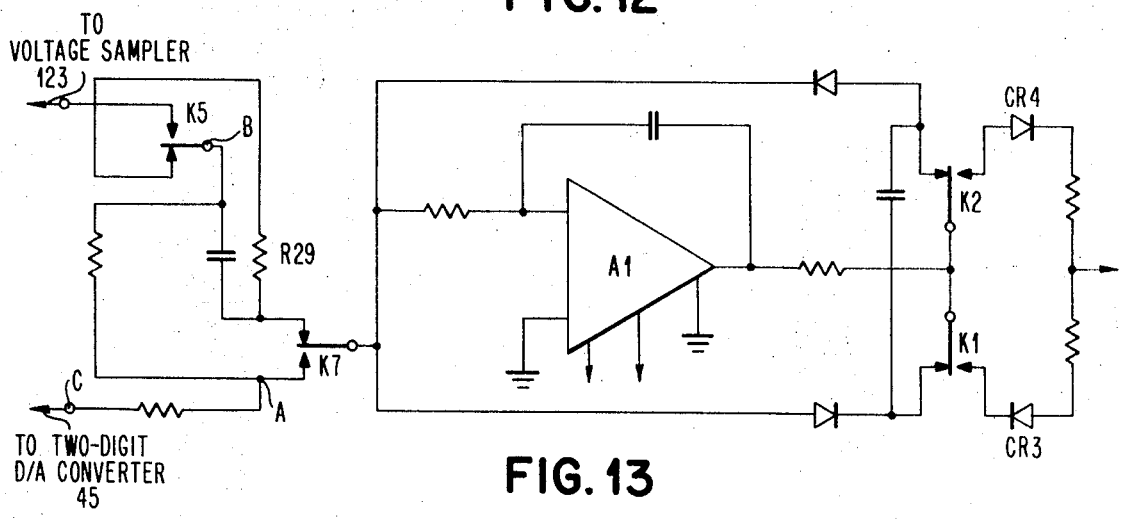
FIG. 13 is a schematic circuit diagram of the peak detector circuit in its strobe initialization mode.

For an understanding of the operation of the peak detector circuit in its strobe initialization function reference is now had to FIG. 13 which shows the peak detector circuit in schematic diagram. Relays K1, K2, K5 and K7 are picked. To produce a positive voltage at point B and thus provide an output for the measuring assembly, an equal and opposite initialization voltage is applied at point C from the two-digit D/A converter 45. Since point A is at virtual ground potential, the voltage at point B will be equal and opposite to the voltage at point C. The output of operational amplifier A1 will supply a current to an integrator in the measuring assembly through diode CR3 and CR4 to maintain the output at the intended voltage. To place a positive strobe initialization voltage at point B a negative voltage equal to the voltage desired at point B would be placed at point C by an external voltage source. When the initialization circuit is removed from the voltage sampler subassembly, the subassembly will seek the voltage on the UUT response signal coincident in time with the positive strobe.

Figure 14:
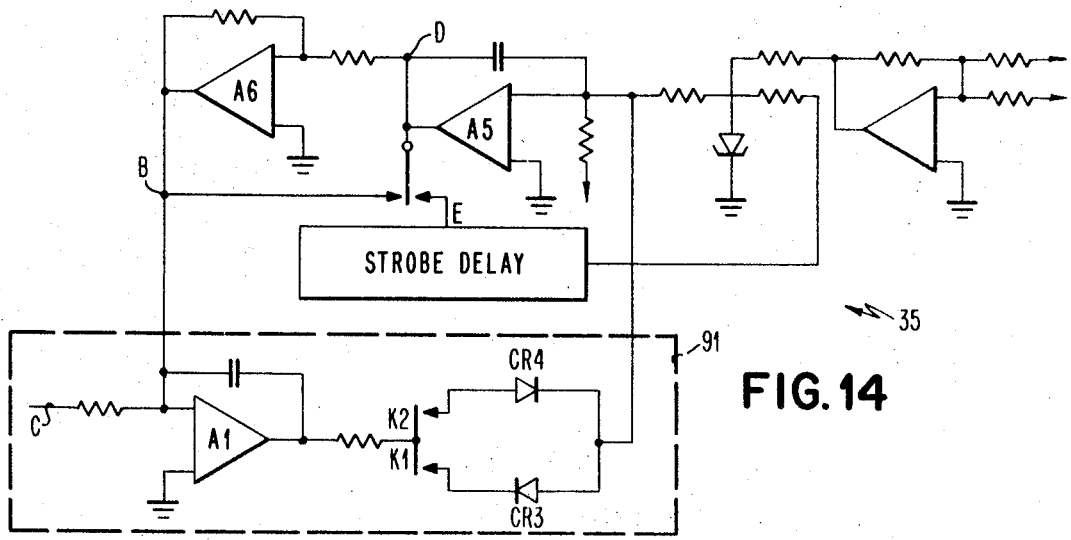
FIG. 14 is a schematic circuit diagram of the peak detector circuit in its time mode of operation.

The strobe initialization function in the time mode is shown in FIG. 14 in which so much of the peak detector circuit and measuring assembly is shown as is required for understanding. The initialization voltage applied is dependent on the transition to which time is to be measured. A positive voltage of between 0 to +10 volts is applied to the time control line of the strobe delay and strobe generator subassembly. In the positive transition mode, point D is connected to the time control voltage point E on the strobe delay and strobe generator. To obtain a positive voltage at point E, a positive voltage must be applied at point C resulting in an equal and opposite voltage at point B. The voltage at point D which is connected to point E is equal and opposite in polarity to the voltage at point B. Therefore, the voltage at point D equals the voltage at point C. In the negative transition mode point D is connected to point E. To place a positive voltage at point E a negative voltage must be applied to point C. When the circuit is removed from the voltage sampler subassembly, the subassembly will seek the level to which time is to be measured.

When a channel is making a peak voltage or valley voltage measurement a sweep generator circuit 93 replaces the output of the four-digit D/A converter 41 and generates a voltage sweep, typically 0 to +10 volts.

The output of the sweep generator circuit 93 causes the positive strobes to occur at an infinite number of points throughout the time window. If the time window has been properly placed in time, the peak or valley voltage to be measured will occur at some point in the time within the time window. Because the positive strobe is made to occur at an infinite number of points within the selected time window, the strobe will eventually occur simultaneously with the peak or valley voltage. When it does, the voltage sampler output reaches its highest or lowest value, and the strobe initialization/peak detector circuit causes the voltage sampler to maintain this output.

Figure 15:
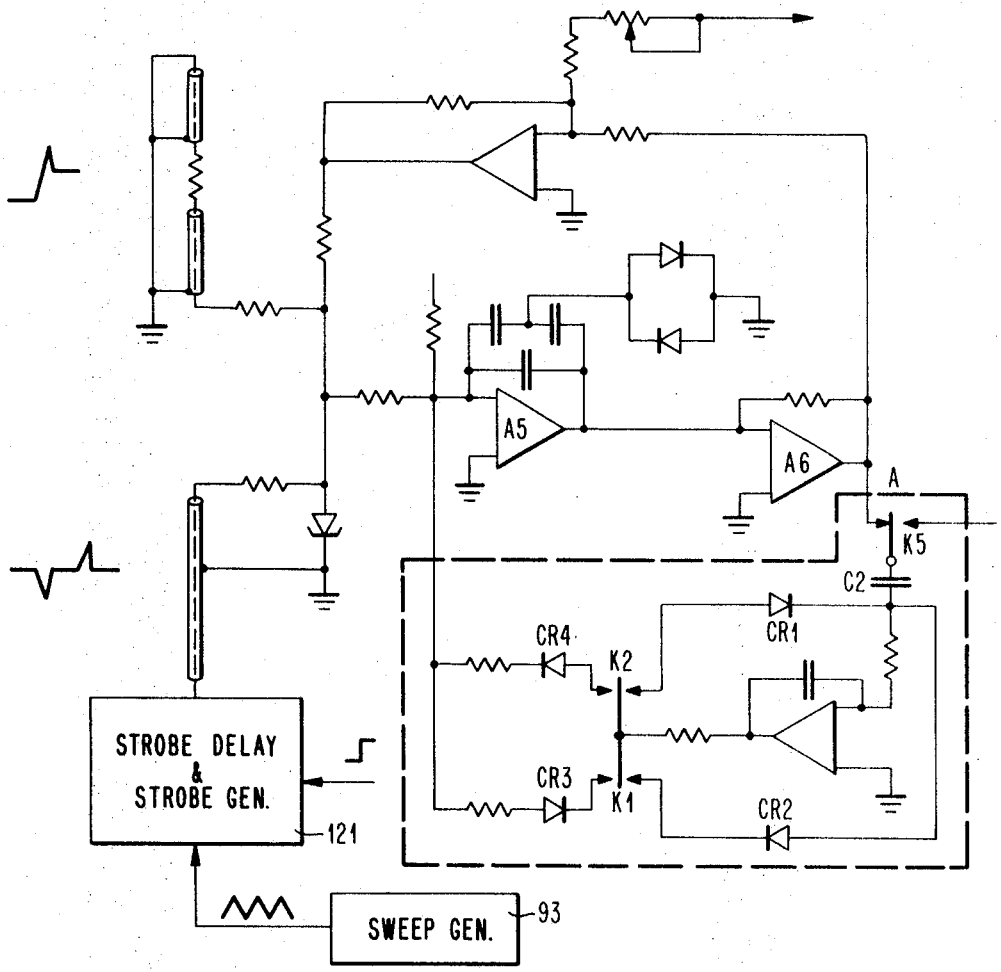
FIG. 15 is a schematic circuit diagram of the peak detector circuit in its peak or valley detecting mode of operation.

For an understanding of the operation of the peak detector circuit in its peak detection mode, reference is had to FIG. 15. The sawtooth output of the sweep generator circuit is routed through the relay circuit card and relay panel to the strobe delay and strobe generator assembly. The sawtooth output sweeps the strobe signal through the time window so that the strobe occurs at each instance of time within the time window.

The connection necessary to make the positive peak measurement is as shown. When positive peak measurements are made, relays K5 and K2 are picked and then the strobe pulse is swept across the signal by the sawtooth output into the strobe delay and strobe generator. Point A (output of A6) tries to track the UUT response signal. Voltage level at point A varies through the action of a feedback loop. Capacitor C1 in the loop, charges through diode CR2 causing current to flow through diode CR4 into the summing mode of integrating operational amplifier A5. This action causes the output of A5 to go negative and converter A6 to go positive. Therefore, the voltage at point A tracks the UUT response signal. After a few sweeps, point A rises to a voltage level which is a multiple of the voltage of the peak UUT response signal. Capacitor C1 charges up to this voltage but is prevented from discharging by low leakage diode CR2 and operational amplifier A1. The voltage at point A corresponds to the multiple of the most positive level of the signal. Resistor R29 (FIG. 13) discharges capacitor C1 when switching out of the peak measurement mode.

When making a valley measurement, relays K1 and K5 are picked. Diodes CR1 and CR3 are substituted for CR2 so that capacitor C1 may charge up in the opposite direction of the plus peak measurement. The voltage at point A then represents the most negative voltage on the UUT response signal.

3b. Sweep Controller Circuit

Figure 16:
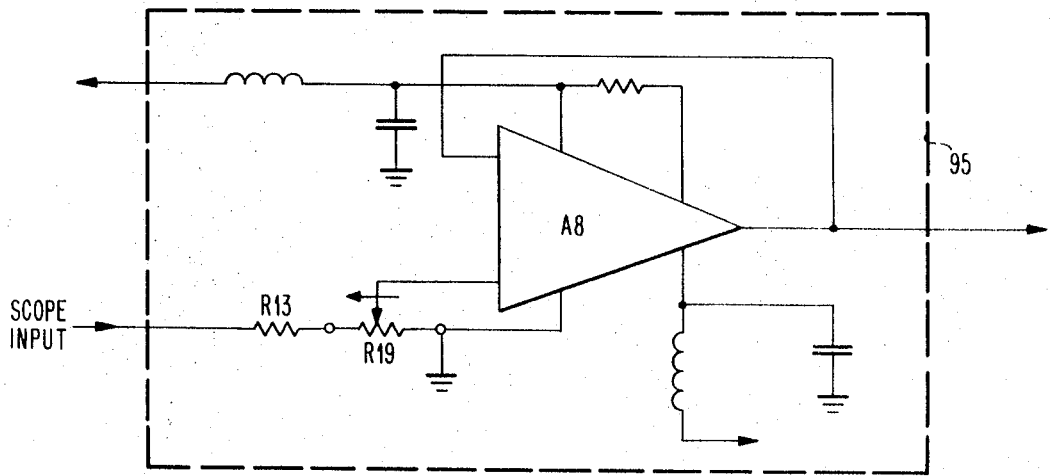
FIG. 16 is a schematic circuit diagram of the sweep controller circuit.

The sweep controller circuit 95 is used when the system is being used in the oscilloscope mode. The circuit uses the sawtooth output of the sawtooth generator of a real time oscilloscope to sweep the strobe pulse in the measuring assembly across the UUT response signal in synchronization with the time base of the oscilloscope. Referring to FIG. 16 the operation amplifier A8 connected as a follower, attenuates the sawtooth wave from the oscilloscope to 0 to 10 volts. Resistor R13 and gain potentiometer R19 are a voltage divider at the positive input to A8. The minus input terminal of operational amplifier A8 is connected to the output and follows the plus terminal input. The attenuated sawtooth output of A8 is applied to the strobe delay circuit in the measuring assembly. To summarize, the input to the sweep controller circuit is the sawtooth output of the sawtooth generator of a real time oscilloscope. The sawtooth output of the sweep controller circuit 95 is attenuated to a 0- to +10-volt range and positions the occurrence of the positive strobes at an infinite number of points in the selected time windows. This synchronizes the operation of the one or both channels with the time base of the real time oscilloscope.

3c. Relay Circuit Card

The relay circuit card 59 works with the relay panel in the measuring assembly to perform the switching actions that are required to support the mode of operation in effect.

4. DC Multiplex Circuit Card

The DC multiplex circuit card 61 isolates and filters the output from channel A and channel B and provides a differential output that represents the output of channel A subtracted from the output of channel B. The DC multiplex circuit card is the final stage between the system 21 and the external control means 27, the digital voltmeter, or any other device that is being used to record or indicate the answer provided by the system.

The states of the relays that control the inputs applied to the operational amplifiers depend upon the mode of operation that is in effect. Thus if channel A is in the voltage mode the output voltage of channel A voltage sampler is applied to operational amplifier A-1. Similarly if channel B is in the voltage mode the output voltage of the channel B voltage sampler is applied to the operational amplifier A-2. If either channel is in the time mode, the voltage sampler output voltage is replaced by the voltage sampler feedback loop voltage which is the same voltage that changes the position of the positive strobe in the selected time window during a time measurement. A3 provides for differential measurement by subtracting A1 from A2.

5. Analog/Digital/Analog (ADA) Subassembly

The ADA assembly 57 contains four identical ADA circuits 101. These circuits provide the analog voltages which when programmed, automatically correct voltage and time offsets in the two channels of the system, insuring that the system always provides accurate voltage and time measurements. Two of the ADA circuits correct voltage offsets, each one being connected to a separate voltage sampler in the measuring assembly. If the voltage offsets corrected by these two ADA circuits were allowed to exist, the voltage sampler output would represent the measured voltage plus the offset voltage. In the time mode the voltage sampler would measure the time to reach the preselected instantaneous voltage plus the offset voltage.

The other two ADA circuits correct time offsets. One ADA circuit is connected to one of the strobe delay and strobe generator subassemblies in the measuring assembly 35. If the time offsets corrected by these ADA circuits 101 were allowed to exist, time 0 in each of the three time windows would effectively be moved in time. Since both channels measure time with respect to time 0, all time measurements therefore would be erroneous.

Figure 17:
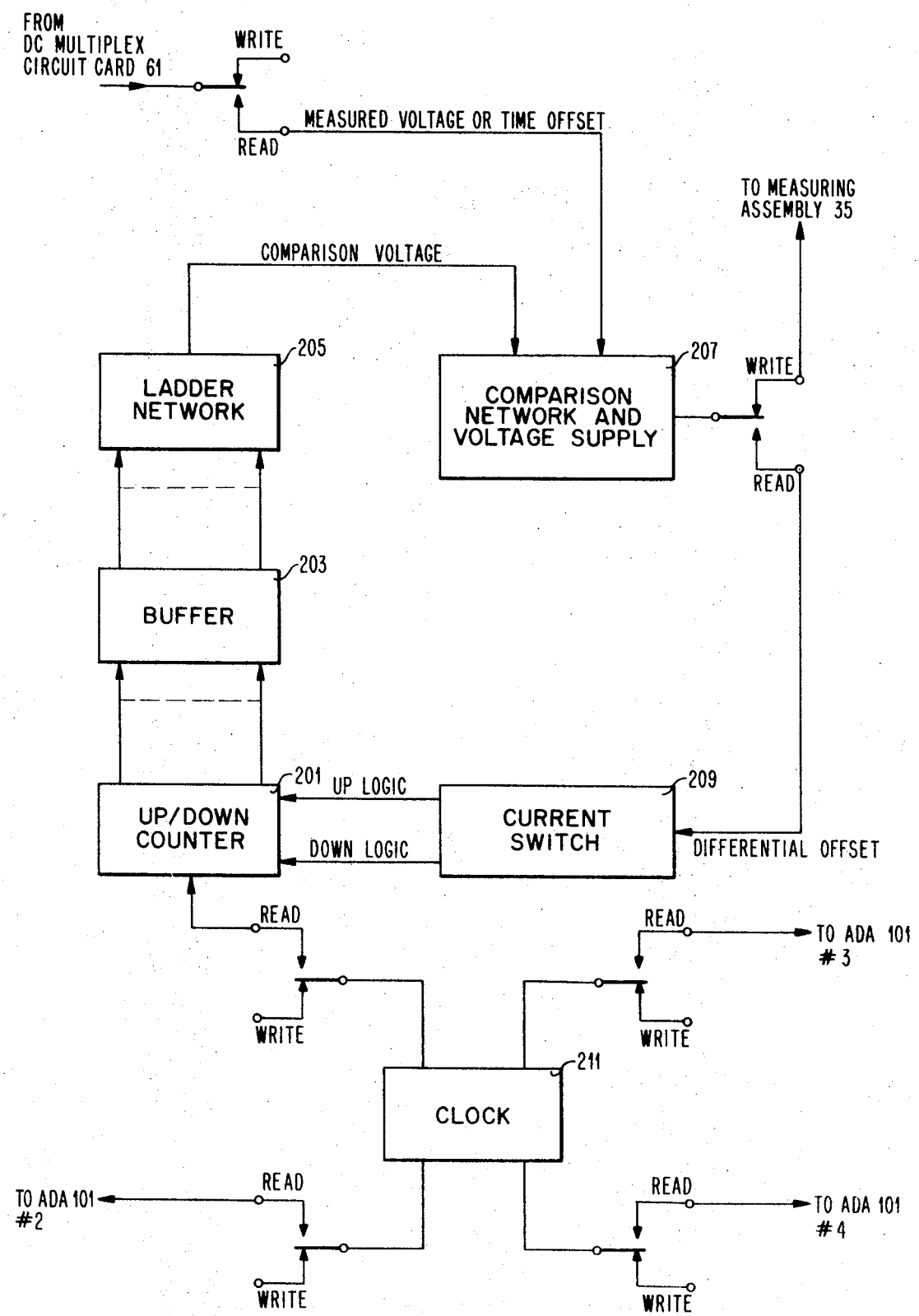
FIG. 17 is a block diagram of an ADA circuit.

Referring to FIG. 17, the ADA circuit has two modes of operation, the read mode and the write mode, with each circuit normally being in the write mode. Basically, the ADA circuit is a power supply with a remotely programmed memory. During a typical write operation, the state of the up/down counter 201 represents an offset stored there during a previous read operation. A buffer 203 continuously senses the state of the up/down counter 201 through data lines. The buffer acts as a current driver for a ladder network 205, and routes the digital value stored in the up/down counter 201 to the ladder network 205. The ladder network 205 continuously converts its digital input into an equivalent analog output, and applies this output to a comparison network and voltage supply 207. The output of the ladder network 205 is equal in magnitude and opposite in polarity to the previously measured offset. The voltage supply 207 reverses the polarity of the output of the ladder network 205, and generates an equivalent offset-correction voltage. In the write mode, the ADA circuit relays route this voltage to the measuring assembly where it corrects the previously measured offset.

Existing offsets in either channel must be measured before they can be automatically corrected. Voltage offsets must be corrected before time offsets can be corrected. When either channel is set up to measure an existing voltage offset, it is set up to measure 0 volts. When the channel measures 0 volts the voltage sampler output should be 0 volts. Any output other than 0 volts represents the voltage offset. When one of the channels is set up to measure an existing time offset, the special time calibrate stimuli and time calibrate signal from the time calibrate circuit 81 replace the normal stimuli and UUT response signal. The time calibrate signal is delayed so that it achieves a predetermined voltage at the same time as time 0 in the 10-nanosecond window occurs. The 10-nanosecond time window is selected and the channel is set up for a time measurement. The output of the channel should represent 0 time because time is measured with respect to time 0 and the predetermined voltage point in the time calibrate signal occurs simultaneously with time 0. Any output other than 0 volts represents the time offset. The DC multiplex circuit card 61 continuously routes the outputs of both channels to the ADA circuit 101.

The ADA circuit 101 reads the offset when the read mode is selected. In the read mode, the ADA circuit relays route the measured voltage or time offset to the comparison network and voltage supply 207. The comparison network compares the offset voltage with the output of the ladder network 205. If the comparison voltage output of the ladder network 205 is equal in magnitude and opposite in polarity to the measured offset, the comparison network generates no output. This indicates that the ladder network 205 is generating the proper voltage to correct the existing offset. It also indicates that the offset measured most recently is the same as the offset that was previously measured.

If additional drift caused the existing offset to change since it was last measured, the comparison network and voltage supply 207 generates a voltage that represents the differential offset, and relays route this output to a current switch 209. The current switch controls the direction in which the up/down counter 201 counts.

The up/down counter is grated by a clock 211, which is shared by all four ADA circuits. If the current switch 209 applies up logic to the up/down counter 201, the counter counts up increasing the stored digital value. If down logic is applied, the counter counts down, decreasing the stored digital value. The buffer 203 continuously senses the changing state of the up/down counter 201 and applies the changing value to the ladder network 205. The comparison voltage output of the ladder network 205 continuously represents the changing state of the up/down counter 201, and the comparison network 207 continuously compares the comparison voltage with the measured offset voltage.

When the comparison voltage is equal and opposite to the measured offset voltage, the differential offset output of the comparison network and voltage supply is 0 volts. This causes the current switch 209 to remove the up logic or down logic input to the up/down counter 201, and the up/down counter stops counting. The state of the up/down counter now represents, in digital form, the most recently measured offset, and the function of the read mode is complete. When the ADA circuit is switched back to the write mode, the ladder network 205 continuously generates an output that is the analog equivalent of the digital value stored in the up/down counter 201. The comparison network and voltage supply reverses the polarity and generates the new voltage and the relays route this voltage to the measuring assembly.

C. Measuring Assembly

The measuring assembly 35 makes the basic voltage or time measurements. The measuring assembly contains two strobe delay and strobe generator subassemblies 121, one for each channel, two voltage sampler subassemblies 123, one for each channel, a relay panel 125, a +24-volt DC power supply subassembly, and a −24-volt DC power supply subassembly.

Each of the two channels in the measuring assembly 35 can operate independently. Both can be in the voltage mode or the time mode, or one can be in the voltage mode and the other in the time mode. They can make measurements on the same UUT response signal or on different UUT response signals.

The mode of operation for each channel can be selected (by simple switch means not shown) manually or remotely. In the voltage mode either channel measures the instantaneous voltage that exists in the UUT response signal at any preselected point in time. In the time mode, either channel measures the time that the UUT response signal takes to reach a preselected instantaneous voltage. Any instantaneous voltage that is not part of a DC level can be selected for a time measurement. This assembly which can be used alone forms the subject matter of a copending application of John F. Merrill entitled "Pulse Measuring System," Ser. No. 663,710, filed Aug. 28, 1967, and assigned to the same assignee as the present invention, and the description thereof is incorporated herein by reference. While the measuring assembly can be used alone, its capabilities are greatly extended when used as a part of the system forming the subject matter of this application.

1. Strobe Delay and Strobe Generator Subassemblies

The measuring assembly has two identical strobe delay and strobe generator subassemblies 121, one for each channel.

1a. Strobe Delay Circuit

The strobe delay circuit 121 has two basic functions: to establish the length of the time window; and, to accurately position the positive strobe within the established time window.

The strobe delay circuit 131 positions the positive strobe within the selected time window under the control of one of five possible analog inputs. These are: (a) the output of the four-digit D/A converter 41; (b) the output of the sweep generator circuit 93 in the peak detector subassembly 55; (c) the output of the sweep controller circuit 95, also in the peak detector subassembly 55; (d) the output of the reference voltage source on the DC multiplex circuit card 61; and, (e) the analog voltage developed by the voltage sampler feedback loop.

The strobe delay circuit 131 controls the position of the positive strobe by triggering a strobe generator circuit 133 at some controlled point in time after the stimuli pulse occurs. Each time that the strobe generator circuit 133 is triggered, it generates one negative and one positive strobe pulse and applies these pulses to the voltage sampler 123. In the voltage mode the voltage sampler 123 measures the instantaneous voltage that exists at the time that the positive strobe occurs. In the time mode, the voltage sampler feedback loop causes the positive strobe to occur simultaneously with the preselected instantaneous voltage, and indicates the elapsed time between the time that the positive strobe occurs and time 0 in the selected time window.

The stimuli output of the time calibrate and AC multiplex subassembly 53 represents the position of time 0 in time. The occurrence of time 0 can also be delayed. The window delay circuit 73 in the countdown and the window delay subassembly 51 delays the position of time 0 in time.

The time window is delayed by the time window delay subassembly 73. The position of the positive strobe within the selected time window is delayed by the strobe delay and strobe generator assembly 121. Thus the strobe delay 131 and strobe generator 133 can delay the occurrence of the positive strobe to any point within the selected time window, but the earliest point in time that the selected time window can start is controlled by the output of the countdown and time window delay subassembly 51.

1b. Strobe Generator Circuit

Each time that it is triggered by the strobe delay circuit 131, the strobe generator circuit 133 generates one negative and one positive strobe. The negative strobe occurs first, and the positive strobe occurs 30 nanoseconds later. Because of the function of the strobe delay circuit 31, the positive strobes are properly placed in time within the selected time window.

These strobes are routed through a delay line to the tunnel-diode discriminator circuit in the voltage sampler 123. The negative strobe causes the tunnel diode to reset. The positive strobe causes the tunnel diode to fire, or not to fire, depending on the relationship in amplitude between the UUT response signal current and the tunnel-diode-bias current.

2. Voltage Sampler Subassembly

The measuring assembly includes two voltage sampler subassemblies 123, one for each channel. The function of the voltage sampler 123 is to sample the instantaneous voltage that exists on the UUT response signal at the time that the positive strobe occurs, regardless of whether the channel is operating in the voltage mode or in the time mode.

In the voltage mode, the voltage sampler 123 measures the instantaneous voltage that exists on the UUT response signal at the time that the positive strobe occurs. The output of the voltage sampler represents the measured voltage, and is used as the channel's output. The output of the voltage sampler 123 is always 10 times the measured voltage.

In the time mode, the voltage sampler 123 also samples the instantaneous voltage that exists on the UUT response signal at the time that the positive strobe occurs, but the feedback control circuit (part of the voltage sampler feedback loop) interacts with the strobe delay circuit 131 in the strobe delay and strobe generator assembly 121 to change the position of successive positive strobes in time. In the time mode, the output of the four-digit D/A converter 41 represents the instantaneous voltage to which time will be measured. The discriminator circuit samples the instantaneous voltage that exists when a given positive strobe occurs and compares the sample voltage with the voltage represented by the output of the four-digit D/A converter 41. The output of the four-digit D/A converter 41 is 10 times the voltage that has been selected for a time measurement and the discriminator circuit compares the measured voltage with one tenth of the output voltage of the four-digit D/A converter. Unless the compared voltages are equal, each comparison results in a change in the position of the next positive strobe within the selected time window.

Assuming one is measuring on a positive transition, if the first instantaneous voltage to be sampled is greater than the preselected voltage (represented by the output of the four-digit D/A converter), the feedback control circuit generates an analog voltage and causes the next positive strobe to occur earlier within the selected time window. If the first instantaneous voltage to be sampled is less than the preselected voltage, the feedback control circuit generates an analog voltage that causes the next positive strobe to occur later in the selected time window. When measuring on negative transitions the strobes would be moved in the opposite direction. This analog voltage controls the position of the positive strobe by directly controlling the delay of the strobe delay circuit. The feedback control circuit continuously repositions the positive strobe within the selected time window, until the comparison between the preselected voltage and the most recently sampled voltage shows that the two are equal. Then, the feedback control circuit hunts about this point and the DC level of the feedback control circuit is used as the channel output voltage. This voltage represents the difference in time between the occurrence of time O and the time that the last positive strobe occurred in the selected time window. Since the last positive strobe was made to occur simultaneously with the preselected voltage, the output voltage accurately represents the time that the preselected voltage occurred within the selected time window.

3. Relay Panel

The relay panel 125 functions with the relay circuit card in the controller to support the mode of operation in effect.

D. Operation

1. Voltage Mode of Operation

Figure 18:
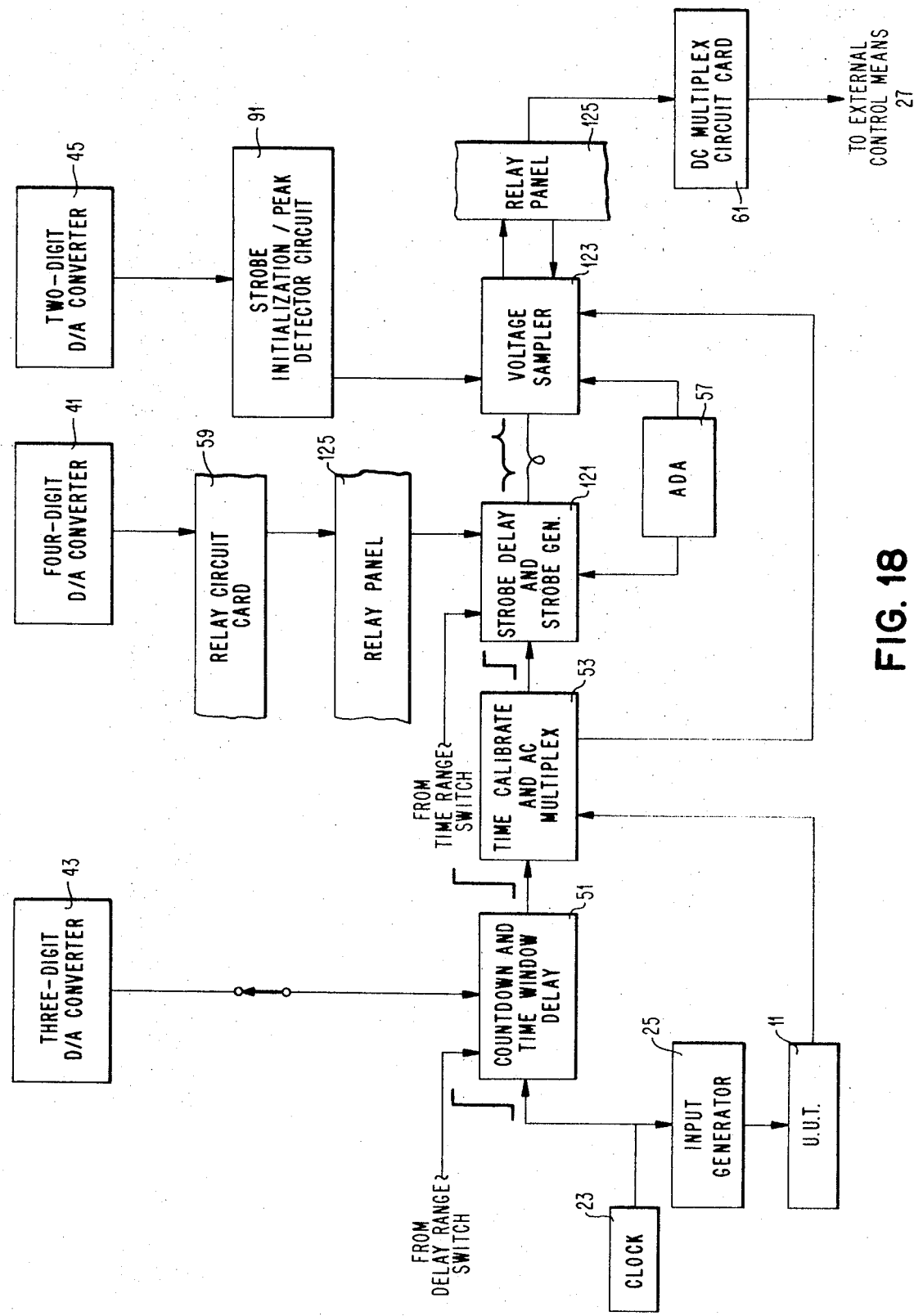
FIG. 18 is a block diagram of those subassemblies required to make a single channel voltage measurement; and, FIG. 19 is a block diagram of those subassemblies required to make a single channel time measurement.

This system makes basic voltage measurements by positioning the occurrence of a positive strobe pulse in time and sampling the instantaneous voltage that exists in the UUT response signal at the time that the positive strobe occurs. FIG. 18 is a detailed block diagram showing those subassemblies that are involved in making a single-channel voltage measurement.

By way of example, let us assume that the output waveshape of a typical UUT should reach +300 millivolts or greater 30 nanoseconds after the UUT is triggered. Thus, given a specific time how is the system set up to measure the instantaneous voltage that exists at this specific time?

The UUT is triggered a fixed period after the sync pulse appears at the input to the countdown and time window delay subassembly 51. The instantaneous voltage to be measured occurs 30 nanoseconds later. Taking into account inherent delays in the system caused by transmission lines and the like, the voltage sampler 123 must be made to sample the instantaneous voltage that exists a period of time after the sync pulse appears at the input to the countdown and time window delay assembly 51.

To measure the instantaneous voltage that exists at the voltage sampler input after the UUT is triggered, a time window must be established that enables this voltage to be measured as accurately as possible at exactly the right time. The established time window should be as small as possible. The countdown and window delay subassembly 51 controls the position of the start of the time window, the strobe delay and strobe generator 121 controls the width of the time window and the width of the time window occurs immediately after time 0 occurs. Voltage measurements are made in the established time window and the smaller the time window the more accurate the time at which a voltage measurement can be controlled. The output of the three-digit D/A converter assembly 43 determines where in time time 0 will occur and the output of the four-digit D/A converter 41 controls the position of the positive strobe within the selected time window. The output of the four-digit D/A converter 41 is routed through the relay circuit card 59 and relay panel 125 to the strobe delay and strobe generator subassembly 121 in the measuring assembly 35. The positive strobe then occurs in coincidence with the instantaneous voltage to be measured. The time window has been established and the positive strobe has been properly located within the time window.

The output of the voltage sampler 123 is preconditioned to enable a speedier system response. The output is preconditioned by forcing it to achieve a particular voltage before the actual voltage measurement is made. This voltage is close to, or the same as the level that the voltage sampler output will achieve after the actual voltage measurement is made. The output of the two-digit D/A converter 45 determines the level to which the voltage sampler output will be preconditioned. The two-digit D/A converter 45 is caused to generate an output which is opposite in polarity and 10 times the value of the expected voltage measurement to be made. The two-digit D/A converter 45 applies its output to the strobe initialization peak detector circuit 91. As soon as the preconditioning voltage is removed from the voltage sampler, the voltage sampler 123 measures the instantaneous voltage of the UUT response signal at the predetermined time. The voltage sampler output immediately becomes 10 times the measured voltage. The relay panel 125 routes this output to the DC multiplex circuit card 61. The DC multiplex circuit card 61 isolates and filters the voltage sampler output. Operational amplifiers on the DC multiplex circuit card 27 route the output of the channel to the external control system 27.

2. Double-Channel Voltage Measurements

The system makes double-channel voltage measurements by making two simultaneous single channel voltage measurements. However, three outputs are available to the operator. These outputs are the input of one channel, the output of the other channel or the output of one channel subtracted from the output of the other channel. Any of these outputs can be selected manually or remotely. Another difference is that the two channels can make voltage measurements on two signals or they can make separate measurements on the same signal.

When the system is set up to make a double channel voltage measurement on one UUT response signal, the UUT response signal can be applied simultaneously to the input of both channels. The UUT response signal is routed to a power divider in the controller where it is split into two signals each of which are half the amplitude of the original.

3. Peak or Valley Voltage Measurements

Either channel may be used alone to measure the peak or valley voltage of a UUT response signal. The sweep generator circuit 93 in the controller controls the location of the positive strobe in a selected time window. The sawtooth output of this sweep generator circuit causes successive positive strobes to sweep across the selected time window. A voltage sampler in the measuring assembly samples an infinite number of instantaneous voltages in the UUT response signal. The output of this voltage sampler keeps changing to represent the last voltage that was sampled. When the voltage sampler output reaches its highest (or lowest) value, the strobe initialization/peak detector circuit 93 in the controller causes the voltage sampler to maintain this output. This output represents the peak or valley voltage of the UUT response signal.

4. Peak-to-Peak Voltage Measurements

In order to make a peak-to-peak voltage measurement, the input UUT response signal is split and routed to both channels. One channel is set to measure the peak voltage and the other channel is set to measure the valley voltage. The operator or programmer subtracts the output of one channel from the output of the other channel to obtain the measurement.

5. Displaying Fast-Rise-Time Signals on Real Time Oscilloscopes

Either channel of the system can be used as a sampling head to display a UUT response signal with a typically fast rise time on a real time oscilloscope. The display will be a slow, accurate analog representation of the original UUT response signal. In addition, the system can be used as a sampling head to display two fast-rise-time signals on a real time, dual-trace oscilloscope. Both channels are required. In operation the output of the oscilloscope sawtooth generator is applied to the controller through the sweep controller circuit 95.

6. Time Mode of Operation

In the time mode of operation the system measures the time that the UUT response signal requires to reach a particular, preselected instantaneous voltage. Any instantaneous voltage in the UUT response signal can be selected for a time measurement as long as the selected instantaneous voltage is not part of a DC level. In the time mode, the output of the four-digit D/A converter 41 represents the instantaneous voltage that has been selected for a time measurement. In the time mode, the output of the four-digit D/A converter 41 is applied to the voltage sampler. The voltage sampler uses the four-digit D/A converter output as a comparison voltage. The voltage sampler compares the instantaneous voltage that exists at the time that each positive strobe occurs with one-tenth the output of the four-digit D/A converter. The time measurement is completed when this comparison shows that the two voltages are equal.

In the time mode the output of the two-digit D/A converter 45 controls the initial placement of the positive strobe within the selected time window before the time measurement is made.

In the time mode the analog voltage of the voltage sampler feedback loop serves as the voltage sampler output. After a time measurement has been made, this voltage represents the difference between the time time 0 in the selected time window occurs and the time that the preselected voltage occurs. While the time measurement is being made, the same analog voltage of the voltage sampler feedback loop controls the location of the positive strobe within the selected time window. This voltage is applied to the delay circuit in the delay and strobe generator assembly and causes successive positive strobes to occur earlier or later in the time window until the positive strobe is finally made to occur at the time that the preselected instantaneous voltage occurs on the UUT response signal.

The system makes basic time measurements by sampling the instantaneous voltage of the UUT response signal that exists at the time that the initial positive strobe occurs, comparing the sample voltage with the preselected voltage represented by the output of the four-digit D/A converter 41 and generating the proper analog feedback voltage to move successive positive strobes closer to the actual preselected voltage. When the positive strobe occurs simultaneously with the preselected voltage, the system output represents the time at which the preselected voltage occurred with respect to time 0 in the selected time window.

Figure 19:
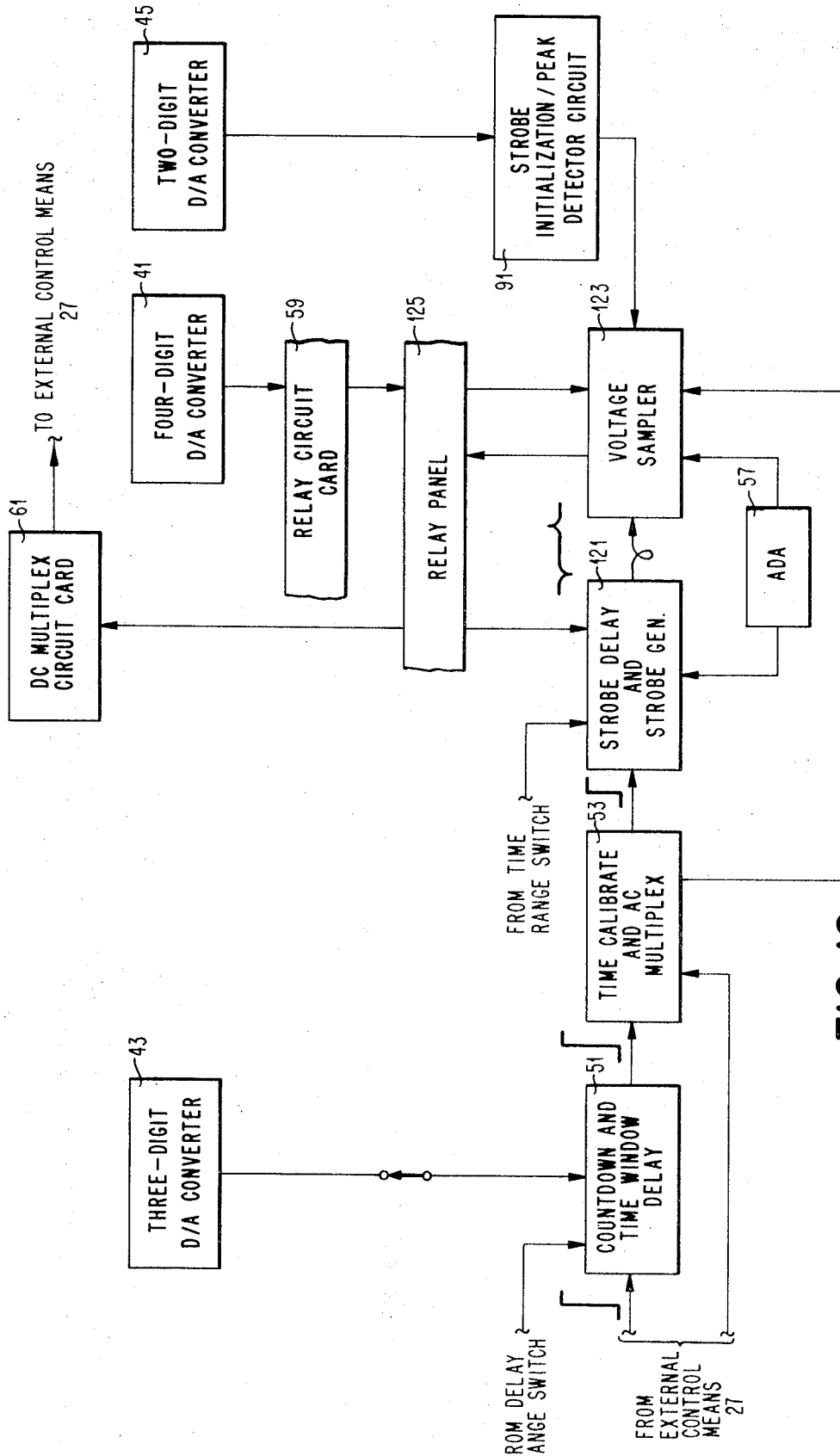

FIG. 19 is a detailed block diagram showing those subassemblies or circuits that are involved in making single-channel time measurements. Assume for purpose of illustration that the UUT response signal of a typical UUT should achieve −300 millivolts 10 nanoseconds after the UUT is triggered. One is interested in ascertaining the UUT response signal actually achieves −300 millivolts.

The output of the four-digit D/A converter 41 is selected to represent this instantaneous voltage. The output of the four-digit D/A converter 41 is routed to the voltage sampler 123 for use as a comparison voltage. The voltage sampler compares the instantaneous voltage that exists when each positive strobe occurs with one-tenth of the four-digit D/A converter output. The voltage sampler feedback loop generates an analog voltage, the value of which depends on the results of this comparison. The analog feedback voltage is applied to the delay circuit in the delay and strobe generator 121, and causes successive positive strobes to occur closer and closer to the preselected instantaneous voltage.

Eventually the analog feedback voltage causes the positive strobe to occur at the same time that the preselected instantaneous voltage occurs. When this happens the comparison between the sample voltage of the UUT response signal and one-tenth the voltage of the four-digit D/A converter output shows that the two voltages are equal. At this time the time measurement is complete. The analog feedback voltage then represents the point in time within the selected time window at which the preselected voltage occur.

The output of the three-digit D/A converter determines the start of the time window. The output of the four-digit D/A converter determines the voltage selected for time measurement. The output of the two-digit D/A converter determines the initial placement of the strobe within the time window. Causing the initial positive strobe to occur as close as possible to the time when the preselected voltage will occur provides the fastest time measurements. The two-digit D/A converter output is removed from the voltage sampler. The voltage sampler immediately and automatically begins to make the time measurement.

7. Double Channel Time Measurements

Double channel time measurements are made by making two simultaneous single channel time measurements. The output of each channel represents the time at which that channel's preselected voltage occurred.

What I claim is:

1. A test system for a unit under test adapted for operation in combination with a repetitive pulse waveform source providing a sync pulse and a reference pulse to the system, and a stimuli pulse to the unit under test and in response thereto an output waveshape to the system; said system adapted for measuring the voltage level of the output waveshape at a specific time with respect to a reference point in time when said system operates in a voltage mode and the time required with respect to a reference point in time for the output waveshape to reach a specific voltage level when said system operates in a time mode; said system also being adapted to be automatically operated by programmable control means, said system comprising:

a time window delay circuit responsive to said sync pulse source providing at its output a triggering pulse;
a first source of reference potential whose output is connected to said time window delay circuit for controlling the time delay of said time window delay circuit;
pulse-shaping means responsive to the triggering pulse of said time window delay circuit for establishing a time window starting with said reference point in time and a time period during which a measurement on an output waveshape can be made;
generator means for producing a strobe pulse;
delay means connected between said pulse shaper and said strobe generator to control the time of occurrence of said strobe pulse within said time window;
a voltage sampler including
    a tunnel diode discriminator for measuring the amplitude of said output waveshape at the time said strobe pulse occurs,
    means for applying a bias signal to said discriminator,
    means for applying said strobe pulse to said discriminator,
    means for applying said output waveshape to said discriminator,
    means for applying said reference pulse to said discriminator,
    and a feedback loop;
a second source of reference potential whose output establishes the time selected for a voltage measurement when said system operates in a voltage mode and the voltage selected for a time measurement when said system operates in a time mode;
means for routing said second reference potential source to said strobe delay means when said system operates in a voltage mode and to said bias signal application means when said system operates in a time mode;
means for connecting said feedback loop to said bias application means when said system is operating in a voltage mode and to said strobe delay means when said system is operating in a time mode, the voltage in said feedback loop being proportional to the measurement desired, when at strobe occurrence the sum of strobe, output waveshape and bias signals equals the threshold level of said tunnel diode.

2. The invention defined by claim 1 including a countdown circuit having an input adapted for connection to the sync pulse source and an output connected to said time window delay circuit, said countdown circuit providing output pulses whose frequency is no greater than a prescribed maximum and to assure synchronization of said test system with said reference pulse and said output waveshape.

3. The invention defined by claim 2 including a third source of reference potential for preconditioning said voltage sampler close to its expected output and means for applying said preconditioning voltage to said feedback loop prior to sampling of said output waveshape.

4. The invention defined by claim 2 including means for sweeping said strobe pulse through said time window and means for maintaining in said feedback loop a voltage proportional to the maximum amplitude excursion of said output waveshape achieved during said voltage sweep.

5. The invention defined by claim 2 including means for operating said system in an oscilloscope mode, said oscilloscope mode means comprising means for attenuating the sawtooth output of an oscilloscope, said attenuated output being applied to sweep said strobe pulse through said time window in synchronization with the time base of said oscilloscope, and means for monitoring the output of said voltage sampler in the voltage mode with the vertical amplifier of said oscilloscope.

6. The invention defined by claim 1 including means for generating a calibration stimuli and a calibration signal whose relative time occurrences are fixed, and switch means for applying said triggering pulse to said strobe delay means and said output waveshape to said voltage sampler when said test system operates in a normal mode, and for applying said calibration stimuli to said strobe delay means in place of said triggering pulse and said calibration signal to said voltage sampler in place of said output waveshape when said system operates in a calibration mode to thereby detect time and voltage offsets occurring during normal operation of said test system.

7. The invention defined by claim 6 including means for reading said time offset, storing said time offset in digital form, generating an analog time offset correction voltage and applying said time offset correction voltage to said strobe delay means during normal operation of said test system.

8. The invention defined by claim 6 including means for reading said voltage offset, storing said voltage offset in digital form, generating an analog voltage offset correction voltage and applying said voltage offset correction voltage to said voltage sampler during normal operation of said test system.

9. The invention defined by claim 1 including means for generating a calibration stimuli and a calibration signal whose relative time occurrences are fixed, means for checking the time to voltage relationship of said strobe delay means, said checking means including a plurality of different delay standards and a plurality of relays for switching said delay standards in connection with said voltage sampler, and switch means for applying said triggering pulse to said strobe delay means and said output waveshape to said voltage sampler when said test system operates in a normal mode, and for applying said calibration stimuli to said strobe delay means in place of said triggering pulse and said calibration signal to said checking means in place of said output waveshape when said system operates in a calibration mode.

10. A test system for a unit under test adapted for operation in combination with a repetitive pulse waveform source providing a sync pulse and a reference pulse to the system, and a stimuli pulse to the unit under test and in response thereto an output waveshape to the system; said system adapted for making multiple voltage level measurements on the output waveshape at specific times with respect to a reference point in time when said system operates in a voltage mode and the times required with respect to a reference point in time for the output waveshape to reach specific voltage levels when said system operates in a time mode; said system also being adapted to be automatically operated by programmable control means, said system comprising:

a time window delay circuit responsive to said sync pulse source providing at its output a triggering pulse;
a primary source of reference potential whose output is connected to said time window delay circuit for controlling the time delay of said time window delay circuit;
pulse-shaping means responsive to the triggering pulse of said time window delay circuit for establishing a time window starting with said reference point in time and a time period during which measurements on an output waveshape can be made;
first and second generator means for producing a first and second strobe pulse;
first and second delay means connected between said pulse shaper and said first and second strobe generator to control the time of occurrence of said first and second strobe pulses within said time window;
means for splitting said output waveshape;
first and second voltage samplers, each including
a tunnel diode discriminator for measuring the amplitude of said output waveshape at the time said strobe pulse occurs,
means for applying a bias signal to said discriminator,
means for applying said strobe pulse to said discriminator,
means for applying said split output waveshape to said discriminator,
means for applying said reference pulse to said discriminator,
and a feedback loop;
first and second secondary sources of reference potential whose output establishes the time selected for a voltage measurement when said system operates in a voltage mode and the voltage selected for a time measurement when said system operates in a time mode;
means for routing said first and second secondary reference potentials to said first and second strobe delay means, respectively, when said system operates in a voltage mode and to said first and second bias signal application means when said system operates in a time mode;
means for connecting said first and second feedback loop to said first and second bias application means, respectively, when said system is operating in a voltage mode, and to said first and second strobe delay means when said system is operating in a time mode, the voltage in said feedback loop being proportional to the measurement desired, when at strobe occurrence the sum of strobe, output waveshape and bias signals equals the threshold level of said tunnel diode;
filtering means connected to said first and second feedback loops for reading the measurements made by said first and second voltage samplers; and,
means for subtracting the measurements made by said first and second voltage samplers.

11. The invention defined by claim 10 including a countdown circuit 71 having an input adapted for connection to the sync pulse source and an output connected to said time window delay circuit, said countdown circuit providing output pulses whose frequency is no greater than a prescribed maximum and to assure synchronization of said test system with said reference pulse and said output waveshape.

12. The invention defined by claim 11 including first and second tertiary sources of reference potential for preconditioning said first and second voltage samplers, respectively, close to their expected output and means for applying said preconditioning voltages to said first and second feedback loops, respectively, prior to sampling of said output waveshape.

13. The invention defined by claim 11 including first and second means for sweeping said first and second strobe pulses through said time window and means for maintaining in said first and second feedback loops a voltage proportional to the maximum amplitude excursion of said output waveshape achieved during said voltage sweep.

14. The invention defined by claim 10 including means for generating a calibration stimuli and a calibration signal whose relative time occurrences are fixed, and switch means for applying said triggering pulse to said first and second strobe delay means and said output waveshape to said first and second voltage samplers, respectively, when said test system operates in a normal mode, and for applying said calibration stimuli to said first and second strobe delay means in place of said triggering pulse and said calibration signal to said first and second voltage samplers in place of said split output waveshape when said system operates in a calibration mode to thereby detect time and voltage offsets occurring during normal operation of said test system.

15. The invention defined by claim 14 including means for reading said offset, storing said offset in digital form, generating an analog offset correction voltage and applying said offset correction voltage to said voltage sampler during normal operation of said test system.